(12) United States Patent
Schindler, II et al.

(10) Patent No.: US 9,248,619 B2
(45) Date of Patent: Feb. 2, 2016

(54) FORMING THREE-DIMENSIONAL STRUCTURE FROM RECEIVER

(71) Applicants: Roland R. Schindler, II, Pittsford, NY (US); Donald Saul Rimai, Webster, NY (US)

(72) Inventors: Roland R. Schindler, II, Pittsford, NY (US); Donald Saul Rimai, Webster, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 650 days.

(21) Appl. No.: 13/664,754

(22) Filed: Oct. 31, 2012

(65) Prior Publication Data

US 2014/0117588 A1 May 1, 2014

(51) Int. Cl.
| | |
|---|---|
| *B65H 45/30* | (2006.01) |
| *B32B 29/08* | (2006.01) |
| *B29C 43/30* | (2006.01) |
| *B29L 31/60* | (2006.01) |
| *B29D 99/00* | (2010.01) |
| *B32B 37/12* | (2006.01) |
| *B41M 3/00* | (2006.01) |

(52) U.S. Cl.
CPC .......... *B29D 99/0089* (2013.01); *B29C 43/305* (2013.01); *B32B 37/1292* (2013.01); *B41M 3/00* (2013.01); *B65H 45/30* (2013.01); *B29L 2031/608* (2013.01); *B31B 2201/88* (2013.01); *B31B 2201/95* (2013.01); *B32B 2309/105* (2013.01); *B32B 2317/127* (2013.01)

(58) Field of Classification Search
CPC . A61F 13/15747; B31B 1/00; B31B 2201/88; B31B 2201/95; B31B 2203/084; B31B 2217/0084; B31B 2217/084; B32B 2309/02; B32B 2309/105; B32B 2310/0831; B32B 2317/127; B32B 37/1292; B29C 43/305; B29D 99/0089; B29L 2031/608; B41M 3/00; B65H 45/30
USPC ..................................... 156/145, 227, 244.12
See application file for complete search history.

(56) References Cited

U.S. PATENT DOCUMENTS

| | | | |
|---|---|---|---|
| 3,793,016 A | 2/1974 | Eichorn | |
| 6,589,000 B1 * | 7/2003 | Boss | ..................... B42C 9/0093 412/18 |
| 2005/0085362 A1 | 4/2005 | Hutchinson et al. | |
| 2008/0159786 A1 | 7/2008 | Tombs et al. | |
| 2011/0076059 A1 | 3/2011 | Suchy et al. | |

FOREIGN PATENT DOCUMENTS

JP       54008532 A * 1/1979

* cited by examiner

*Primary Examiner* — Sonya Mazumdar
(74) *Attorney, Agent, or Firm* — Christopher J. White; Kevin E. Spaulding

(57) ABSTRACT

A method for forming a three-dimensional structure includes depositing a first pattern of thermoplastic toner particles onto a first surface of a receiver to form a plurality of spaced-apart stacks of toner particles that extend above the first surface of the receiver. The receiver is bent so that non-overlapping first and second portions of the receiver are defined. At least part of a surface of the receiver in the second portion is brought into contact with the deposited stacks of toner particles. The toner particles are fused to bind the second portion to the first portion and provide a selected spacing between the first portion and the second portion.

18 Claims, 13 Drawing Sheets

FORMING THREE-DIMENSIONAL STRUCTURE FROM RECEIVER

CROSS-REFERENCE TO RELATED APPLICATIONS

This application is co-filed with and has related subject matter to U.S. patent application Ser. No. 13/664,806 (now U.S. Publication No. 2014/0116604), filed Oct. 31, 2012, titled "INCREMENTALLY FORMING THREE-DIMENSIONAL STRUCTURE FROM RECEIVER;" U.S. patent application Ser. No. 13/664,855 (now U.S. Publication No. 2014/0121088), filed Oct. 31, 2012, titled "THREE-DIMENSIONAL-STRUCTURE FORMER;" and U.S. patent application Ser. No. 13/664,962 (now U.S. Publication No. 2014/0121092), filed herewith, titled "Z-FOLDING THREE-DIMENSIONAL-STRUCTURE FORMER;" each of which is incorporated herein by reference in its entirety.

FIELD OF THE INVENTION

This invention pertains to the field of printed manufacturing and more particularly to printing three-dimensional structures.

BACKGROUND OF THE INVENTION

Corrugated cardboard is widely used to package goods for transit. Such corrugated cardboard, typically comprises an outer sheet of liner sheet (or "linerboard") that is glued to a fluted sheet and a second outer sheet of liner is glued to the fluted sheet opposite the first outer sheet to form a composite structure that has a thickness that is greater than a combined thickness of the individual sheets. The increased thickness provides a number of advantages as compared to the properties of a non-corrugated combination of the same sheets would provide. These advantages include at least increased stiffness along an axis along which the flutes extend, greater resistance to incidental damage, and a greater ability to support a load applied along the axis of the flutes.

More recently, a product that is analogous to conventional corrugated cardboard has been introduced that is made by extruding sheets of polystyrene or other materials that are separated by co-extruded but separated joints. Many versions of this type of product are sold by Coroplast, Vanceburg, Ky., USA. This forms essentially a polymeric version of corrugated cardboard having different properties made possible through the use of the polymeric materials so extruded. This form of corrugation is more expensive than conventional corrugation because of the increased use of polymeric materials and further suffers from weaknesses at the joints in that the joints are typically thin polymeric supports which are subject to lateral collapse when subjected to shear forces.

Corrugated cardboard and extruded corrugated, hereinafter collectively referred to as "conventional corrugated materials," also provide advantages over a solid sheet of cardboard of equivalent thickness in that a solid sheet of cardboard of requires more material than corrugated cardboard and therefore is heaver and more expensive than corrugated material for equivalent thicknesses. For these reasons, corrugated cardboard is popularly applied for use in packaging applications where the weight, cost, resiliency, and an ability to support a stacking load is desirable.

The combination of advantages offered by conventional corrugated materials has also proven value in areas such as signage, light duty structural panels and displays. Accordingly, it is frequently the case that markings are often printed on corrugated cardboard stock. For example, shipping boxes can be printed with decorative colors, trade dress, delivery information, or source indications, as well as information regarding the corrugated material itself, such as edge-crush strength, gross weight, fragile, or this-end-up indicators. Printers typically operate using subtractive color: a substantially reflective receiver (piece of corrugated stock) is overcoated image-wise with cyan (C), magenta (M), yellow (Y), black (K), and other colorants. Markings can include multiple types of content. For example, a box can be printed with text, halftoned photographs, and line-art or other graphics. Additionally, the printed content may vary from one box to another, requiring variable-data printing. However, it is difficult for many high quality printing systems to print on thick stiff corrugated substrates, particularly using high volume presses that are intended for use with thinner more flexible roll fed web media.

For example, U.S. Publication No. 2008/0159786 by Tombs et al., entitled "SELECTIVE PRINTING OF RAISED INFORMATION BY ELECTROGRAPHY," published Jul. 3, 2008, the disclosure of which is incorporated herein by reference, describes electrophotographic printing using marking particles of a substantially larger size than the standard size marking particles of the desired print image. Tombs et al. also describe using non-pigmented ("clear") marking particles to overlay raised information on an image. C-shaped toner patterns can be printed on half a sheet, which is then folded over and sealed with the toner to make an envelope. However, these schemes are very limited in the thickness, and therefore in the mechanical strength, they can provide.

Conventional fluted cardboard can be made at low cost through the use of high volume web production processes that can use, for example, an arrangement of patterned rollers, to form a sinusoidal pattern of fluting in the fluted sheets and different types of corrugated cardboard can be made in such a fashion by varying sinusoidal fluting amplitudes and frequencies. However, those properties cannot readily be adjusted depending on the type of product to be packaged. For example, referring to FIG. 3A, a standard cardboard box is generally formed by stamping forming box blank 301 from a rectangular sheet of corrugated board. Box blank 301 is then folded along fold lines 302, and front surface 303 of tab 304 is glued to back surface 305 to form a manufacturer's joint. As a result, the direction F of extension of flutes 306 (FIG. 3B) is set across the entire box. The designer of the box cannot align flutes differently in different portions of the box. This restricts the box designer's freedom to adjust the mechanical characteristics of the box based on its intended use. For example, a box may need to have comparable strengths in the X and Y directions, corresponding to the horizontal portions of the box, but may need enhanced strength along the Z-direction in the vertical portion to permit the stacking of boxes without increasing the weight of the box unnecessarily. This relative strength configuration cannot be provided by conventional corrugated materials.

FIG. 3B also shows first liner sheet 310, second liner sheet 311, and fluted sheet 312 between them. Starch glue is conventionally applied at each area of contact between fluted sheet 312 and liner sheets 310 or 311.

Presently, shipping departments of companies need to stock a wide variety of boxes in order to ship a wide variety of products to customers. The boxes should be close in size, but larger than, the product to ship. Extra space in each box is filled with packing materials that add additional weight and cost. It would be preferable to form a box that accurately fits the specific items to be shipped.

In addition, maintaining an inventory of the packaging materials and boxes cost money and takes up space. To reduce such costs, the boxes themselves are generally acquired in an unprinted form so that they can be used for any of a variety of different products. This requires that any desired product marketing, promotional, or trade dress or authentication indicia be printed on the box during the shipping process when it can be difficult to provide the high quality printing that is required to form a high quality image.

Conventional corrugated materials have structural limitations. For example, the adhesives used in conventional corrugated cardboard are typically starch-based adhesives. Such adhesives are water-soluble rendering these vulnerable to catastrophic failure in the event that such boxes are exposed to water. Other adhesives, such as epoxy, glue and hot-melt glue can be used. However, these adhesives change volume when they cool, producing internal stresses that can weaken the structural integrity of the corrugated cardboard material, make the corrugated material less planar, or create sinusoidal variations in a surface of the corrugated that make the surface less attractive as a surface on which images are to be printed and that make it more difficult to print on such surfaces.

There is, therefore, a need for ways of making corrugated board and packages that permit adjusting the mechanical properties and the directions in which those properties are effective. There is also a need for ways of making board using durable adhesives that do not create internal stresses in the board.

Corrugated structures have mechanical properties superior to the materials they are made from. Composite structures are also used to provide this advantage. A composite structure has a matrix material with one or more reinforcement materials therein. An example of a composite is FR-4 fiberglass, used as a base for printed circuit boards. FR-4 is a weave of glass fibers fixed in place in an epoxy resin. Composite structures are used for a wide range of applications to provide stiffness and other desirable properties. Composite materials can be formed in curved shapes and other shapes difficult to make with other similarly-strong materials.

However, the manufacturing of composite materials, especially in curved shapes, is generally energy intensive, time consuming, and expensive. For example, to produce a composite panel can require individual steps of selecting the materials, applying adhesive in a desired pattern on a first surface of a first sheet, contacting a first surface of a second sheet against the first surface of the first sheet and pressing them together, often using a mold and while subjecting the combination of the first and second sheet to heat to set or cure the adhesive. These steps can be repeated to build a composite with more than two sheets. After fabrication, the composite structure is trimmed to the proper size. Each composite shape to be produced requires separate molds, increasing the cost of production tooling.

Despite these limitations, composite structures are commonly used, for example, as curved panels on the interior of aircraft and partitions used to separate office spaces. There is a continuing need, therefore, for producing composite structures more quickly and inexpensively. Moreover, as product cycle times become shorter, there is an increasing need for ways of producing composite structures without first building expensive tooling.

SUMMARY OF THE INVENTION

According to the present invention, there is provided a method for forming a three-dimensional structure, the method comprising:

depositing a first pattern of thermoplastic toner particles onto a first surface of a receiver to form a plurality of spaced-apart stacks of toner particles that extend above the first surface of the receiver;

bending the receiver so that non-overlapping first and second portions of the receiver are defined;

bringing at least part of a surface of the receiver in the second portion into contact with the deposited stacks of toner particles; and fusing the toner particles to bind the second portion to the first portion and provide a selected spacing between the first portion and the second portion.

An advantage of various aspects is that they provide a three-dimensional structure that can be readily produced and that can provide improved mechanical properties. Toner is used to adhere portions of a receiver, e.g., a sheet, together. A smaller mass of toner than of some other adhesives can be used to adhere the portions together, reducing mass and weight of the structure.

Another advantage of using toner is that the portions do not have to be pressed so tightly together during bonding that there is a risk of squeezing the adhesive out. This is an advantage over glue.

Unlike glue, hot-melt glue, or rubber cement, toner is stiff (not compliant) after fusing, advantageously reducing the severity of creep in the structure. This also provides the advantage that the dimensions of the deposited toner pattern stay consistent after fusing. For example, lines a certain distance apart will remain that distance apart, which they might not under load if an elastomeric adhesive were used.

Unlike glue or epoxy, toner makes a separable bond. This permits readily recycling a toner structure when it reaches the end of its useful life. However, the toner bond remains strong until heat or other external forces are applied to separate it.

Moreover, toner provides a stronger adhesive bond than hot-melt inkjet inks and similar materials. Toner permits building thicker structures than other adhesives, which in turn provides improved bending moment and other improved mechanical properties compared to thinner structures. Furthermore, toner structures do not weaken as they become thicker in the way that structures using conventional adhesives do. Conventional adhesives wet and thus spread over the surfaces that they contact. Therefore, such adhesives have lower surface energies than the sheet. As a result, glue is effective largely because common sheet materials are microscopically rough. This also means that adhesive failures tend to be cohesive rather than adhesive. That is, the glue does not delaminate from the sheet, but the glue fails in the center of the bulk of glue. The higher the mass of the bulk of glue, the more opportunity there is for a fracture to occur in that bulk. In contrast, fused toner is generally stronger than the sheet, so adhesive failures involving toner tend to result from tearing of the fibers of the sheet rather than cracking of the toner mass. The toner is therefore not the weakest link in the adhesion.

In various aspects (e.g., as shown in FIG. 1), a belt carries sheets through a toner printer. This permits building up thicker structures than printers that wrap the sheets around a drum. In various aspects, an intermediate transfer member is used to permit passing the sheets through the printer without bending or deforming them.

Unlike epoxy, toner does not change in volume while it transitions from the rubbery to the glassy state. Toner is amorphous plastic, not wax. This advantageously reduces the variation between the structure as designed and the structure as produced after fusing. Toner undergoes reduced dimensional shift during the process of making the structure, compared to other adhesives. For example, hot-melt glue reduces in volume by approximately 10% as it solidifies, and aqueous glue (e.g., ELMER'S) also reduces in volume while drying. This reduction in volume can create internal stresses that weaken a structure. The stresses are transferred at least in part to the portions of the sheet, moving the adhesive and the sheet up the stress-strain curve towards the fracture point. Hot melt adhesives cool to a point close to the fracture point on a stress/strain curve. Toner structures according to various aspects do not experience these stresses. During fusing, toner does spread and smear, e.g., undergoing a ~50% increase in dot size laterally. However, this increase does not create stresses on the sheets, since the toner is in a viscous state while spreading. Moreover, the increase is predictable and consistent, so patterns can be readily designed to compensate for this effect. The predictability of this effect can also reduce the probability of localized weak spots that serve as failure nuclei. This effect means that in toner structures, the volume of non-structural mass between toner structures is preserved. The strength of a structure is proportional to the toner density per unit area. Only volume-preserving adhesives (no phase transition, evaporation, cross-linking) provide designed strength in the manufactured item.

Moreover, toner does not undergo a phase transition during fusing. Therefore, it does not release heat, unlike epoxy. This permits making structures using sheet materials that are sensitive to localized heat release. Toner also does not release solvents or volatile organic compounds during fusing. This permits making structures without requiring vapor enclosures.

Toner can be readily positioned precisely (e.g., within 1/600") to form desired patterns, unlike glue or (especially) epoxy. Toner can also be substantially less expensive than epoxy.

In various aspects, multiple toner regions are used to control tensile strength and bending moment independently. Unlike glue, the size (thickness), contents (additives), and position of toner patterns can be readily controlled. Moreover, stiffness varies as the square of the second moment of inertia, or as thickness$^4$. The direction of stiffness can be controlled by selecting an appropriate toner pattern. Unlike prior schemes using toner as an adhesive between surfaces substantially in contact with each other, various aspects described herein use toner to hold portions of a sheet in relationship to each other, with a gap between the portions. Toner can provide tall structures with low mass, no outgassing, and strength along any number of axes. Conventional corrugated board has high mass and provides strength only along one axis or very few axes (e.g., two: tensile with the flutes, and normal to the board). Foaming posterboard outgasses, so it requires more care in handling during production. In various aspects, a single layer of toner is used on the sheet rather than multiple layers. This improves productivity of the printer producing the structures. In various aspects, the toner is a weather-resistant source of strength for wet paper, e.g., lawn signs.

In various aspects, laminates or elements can be made at a customer's site to the customer's specifications.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIGS. 11A-11E show the preparation of an exemplary Z-folded three-dimensional structure;

The attached drawings are for purposes of illustration and are not necessarily to scale.

DETAILED DESCRIPTION OF THE INVENTION

As used herein, the terms "receiver," "receivers," "medium," "media," "recording medium," and "recording media" are used interchangeably. "Receivers" (or any equivalent term) include objects extending (or that can be arranged to extend) significantly farther in two directions than in a third direction of three mutually-orthogonal directions. Most receivers have significant length and width, e.g., 8"×11", but very little thickness, e.g., 4 mil (~0.1 mm). "Sheet" and "web" receivers are used interchangeably except when discussing aspects that are particularly adapted to use one of those styles of receiver. "Adhere" is used herein both intransitively (toner adheres to paper) and transitively (toner adheres two sheets to each other, i.e., the adhesive forces between a toner mass and each of two sheets holds those two sheets together).

Figure 3A:
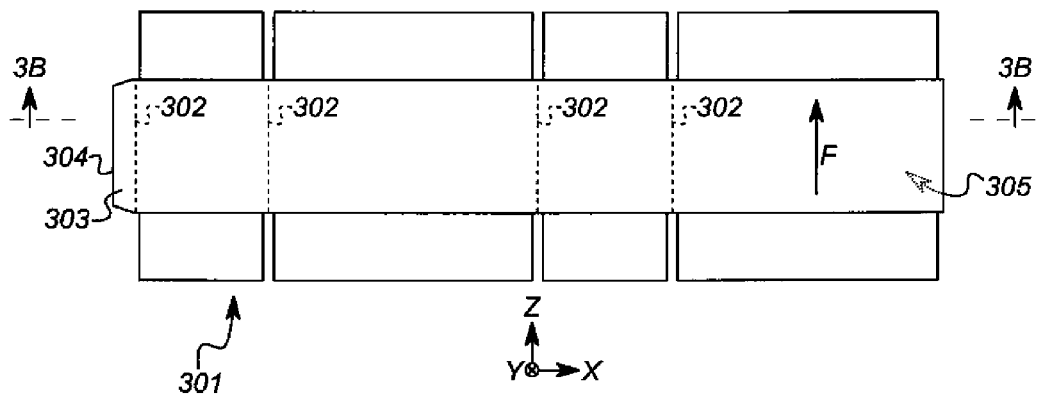
FIG. 3A shows a conventional corrugated box blank.
Figure 3B:
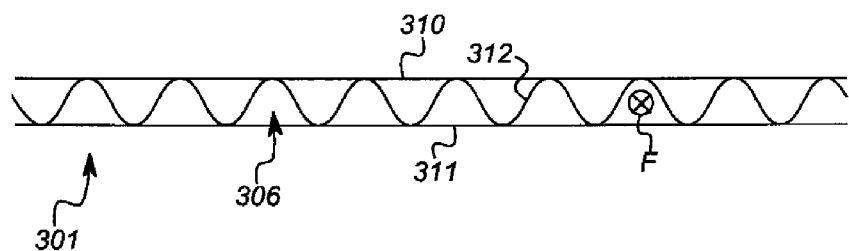
FIG. 3B is a cross-section along the line 3B-3B in FIG. 3A.

Referring back to FIG. 3B, the direction of extension F of flutes 306 is the direction in which a ray extended in direction F will not cross fluted sheet 312, even if extended to the edge of blank 301. In conventional corrugated board, such as that shown here, the opposite to direction F can also be considered the direction of extension of flutes 306, since either direction F or its opposite can be extended to the edges of blank 301 without crossing fluted sheet 312. In conventional corrugated board, each flute 306 (each cycle formed in fluted sheet 312) has a direction of extension substantially equal to that of each other flute 306.

In the following description, some aspects will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, methods described herein. Other aspects of such algorithms and systems, and hardware or software for producing and otherwise processing the image signals involved therewith, not specifically shown or described herein, are selected from such systems, algorithms, components, and elements known in the art. Given the system as described herein, software not specifically shown, suggested, or described herein that is useful for implementation of various aspects is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice methods according to various aspects.

The electrophotographic (EP) printing process can be embodied in devices including printers, copiers, scanners, and facsimiles, and analog or digital devices, all of which are referred to herein as "printers." Electrostatographic printers such as electrophotographic printers that employ toner developed on an electrophotographic receiver can be used, as can ionographic printers and copiers that do not rely upon an electrophotographic receiver. Electrophotography and ionography are types of electrostatography (printing using electrostatic fields), which is a subset of electrography (printing using electric fields).

As used herein, "toner particles" are particles of one or more material(s) that are transferred by an EP printer to a receiver to produce a desired effect or structure (e.g., a print image, texture, pattern, or coating) on the receiver. Toner particles can be ground from larger solids, or chemically prepared (e.g., precipitated from a solution of a pigment and a dispersant using an organic solvent), as is known in the art. Toner particles can have a range of diameters, e.g., less than 8 µm, on the order of 10-15 µm, up to approximately 30 µm, or larger ("diameter" refers to the volume-weighted median diameter, as determined by a device such as a Coulter Multisizer).

"Toner" refers to a material or mixture that contains toner particles, and that can form an image, pattern, or coating when deposited on an imaging member including a photoreceptor, a photoconductor, or an electrostatically-charged or magnetic surface. Toner can be transferred from the imaging member to a receiver. Toner is also referred to in the art as marking particles, dry ink, or developer, but note that herein "developer" is used differently, as described below. Toner can be a dry mixture of particles or a suspension of particles in a liquid toner base. Toner or toner particles can include ceramics or ceramic pigments. Toner particles can have a Young's modulus between 2.5 GPa and 3.5 GPa in the glassy state.

Toner includes toner particles and can include other particles. Any of the particles in toner can be of various types and have various properties. Such properties can include absorption of incident electromagnetic radiation (e.g., particles containing colorants such as dyes or pigments), absorption of moisture or gasses (e.g., desiccants or getters), suppression of bacterial growth (e.g., biocides, particularly useful in liquid-toner systems), adhesion to the receiver (e.g., binders), electrical conductivity or low magnetic reluctance (e.g., metal particles), electrical resistivity, texture, gloss, magnetic remnance, florescence, resistance to etchants, and other properties of additives known in the art.

In various aspects, large-particle toners or large-particle clear toners ("DMCL") are used. Examples are described in commonly-assigned U.S. Patent Publication No. 2008/0159786 by Tombs et al., the disclosure of which is incorporated herein by reference.

A digital reproduction printing system ("printer") typically includes a digital front-end processor (DFE), a print engine (also referred to in the art as a "marking engine") for applying toner to the receiver, and one or more post-printing finishing system(s) (e.g. a UV coating system, a glosser system, or a laminator system). A printer can reproduce pleasing black-and-white or color onto a receiver. A printer can also produce selected patterns of toner on a receiver, which patterns (e.g. surface textures) do not correspond directly to a visible image. The DFE receives input electronic files (such as Postscript command files) composed of images from other input devices (e.g., a scanner, a digital camera). The DFE can include various function processors, e.g. a raster image processor (RIP), image positioning processor, image manipulation processor, color processor, or image storage processor. The DFE rasterizes input electronic files into image bitmaps for the print engine to print. In some aspects, the DFE permits a human operator to set up parameters such as layout, font, color, media type, or post-finishing options. The print engine takes the rasterized image bitmap from the DFE and renders the bitmap into a form that can control the printing process from the exposure device to transferring the print image onto the receiver. The finishing system applies features such as protection, glossing, or binding to the prints. The finishing system can be implemented as an integral component of a printer, or as a separate machine through which prints are fed after they are printed.

The printer can also include a color management system which captures the characteristics of the image printing process implemented in the print engine (e.g. the electrophotographic process) to provide known, consistent color reproduction characteristics. The color management system can also provide known color reproduction for different inputs (e.g. digital camera images or film images).

In an aspect of an electrophotographic modular printing machine, e.g. the NEXPRESS 3000SE printer manufactured by Eastman Kodak Company of Rochester, N.Y., color-toner print images are made in a plurality of color imaging modules arranged in tandem, and the print images are successively electrostatically transferred to a receiver adhered to a transport web moving through the modules. Colored toners include colorants, e.g. dyes or pigments, which absorb specific wavelengths of visible light. Commercial machines of this type typically employ intermediate transfer members in the respective modules for transferring visible images from the photoreceptor and transferring print images to the receiver. In other electrophotographic printers, each visible image is directly transferred to a receiver to form the corresponding print image.

Electrophotographic printers having the capability to also deposit clear toner using an additional imaging module are also known. As used herein, clear toner is considered to be a color of toner, as are C, M, Y, K, and Lk, but the term "colored toner" excludes clear toners. The provision of a clear-toner overcoat to a color print is desirable for providing protection of the print from fingerprints and reducing certain visual artifacts. Clear toner uses particles that are similar to the toner particles of the color development stations but without colored material (e.g. dye or pigment) incorporated into the toner particles. However, a clear-toner overcoat can add cost and reduce color gamut of the print; thus, it is desirable to provide for operator/user selection to determine whether or not a clear-toner overcoat will be applied to the entire print. A uniform layer of clear toner can be provided. A layer that varies inversely according to heights of the toner stacks can also be used to establish level toner stack heights. The respective toners are deposited one upon the other at respective locations on the receiver and the height of a respective toner stack is the sum of the toner heights of each respective color. Uniform stack height provides the print with a more even or uniform gloss.

Figure 1:
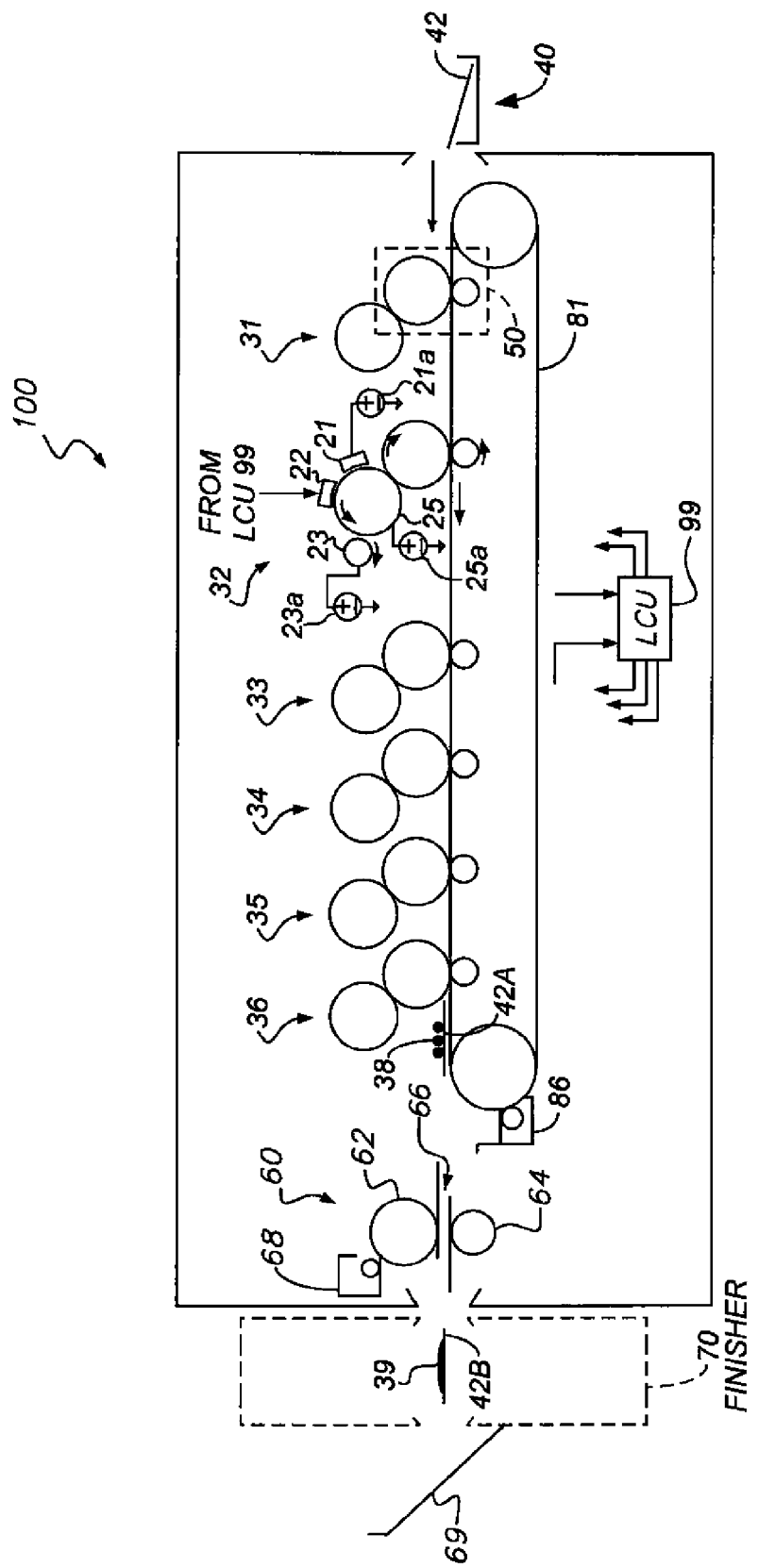
FIG. 1 is an elevational cross-section of an electrophotographic reproduction apparatus.

FIG. 1 is an elevational cross-section showing portions of a typical electrophotographic printer 100. Printer 100 is adapted to produce print images, such as single-color (monochrome), CMYK, or hexachrome (six-color) images, on a receiver (multicolor images are also known as "multi-component" images). Images can include text, graphics, photos, and other types of visual content. An aspect involves printing using an electrophotographic print engine having six sets of single-color image-producing or -printing stations or modules arranged in tandem, but more or fewer than six colors can be combined to form a print image on a given receiver. Other electrophotographic writers or printer apparatus can also be included. Various components of printer 100 are shown as rollers; other configurations are also possible, including belts.

Referring to FIG. 1, printer 100 is an electrophotographic printing apparatus having a number of tandemly-arranged electrophotographic image-forming printing modules 31, 32, 33, 34, 35, 36, also known as electrophotographic imaging subsystems. Each printing module 31, 32, 33, 34, 35, 36 produces a single-color toner image for transfer using a respective transfer subsystem 50 (for clarity, only one is labeled) to a receiver 42 successively moved through the modules. Receiver 42 is transported from supply unit 40, which can include active feeding subsystems as known in the art, into printer 100. In various aspects, the visible image can be transferred directly from an imaging roller to a receiver 42, or from an imaging roller to one or more transfer roller(s) or belt(s) in sequence in transfer subsystem 50, and thence to receiver 42. Receiver 42 is, for example, a selected section of a web of, or a cut sheet of, planar media such as paper or transparency film.

Each printing module 31, 32, 33, 34, 35, 36 includes various components. For clarity, these are only shown in printing module 32. Around photoreceptor 25 are arranged, ordered by the direction of rotation of photoreceptor 25, charger 21, exposure subsystem 22, and toning station 23.

In the EP process, an electrostatic latent image is formed on photoreceptor 25 by uniformly charging photoreceptor 25 and then discharging selected areas of the uniform charge to yield an electrostatic charge pattern corresponding to the desired image (a "latent image"). Charger 21 produces a uniform electrostatic charge on photoreceptor 25 or its surface. Exposure subsystem 22 selectively image-wise discharges photoreceptor 25 to produce a latent image. Exposure subsystem 22 can include a laser and raster optical scanner (ROS), one or more LEDs, or a linear LED array.

After the latent image is formed, charged toner particles are brought into the vicinity of photoreceptor 25 by toning station 23 and are attracted to the latent image to develop the latent image into a visible image. Note that the visible image may not be visible to the naked eye depending on the composition of the toner particles (e.g. clear toner). Toning station 23 can also be referred to as a development station. Toner can be applied to either the charged or discharged parts of the latent image.

After the latent image is developed into a visible image on photoreceptor 25, a suitable receiver 42 is brought into juxtaposition with the visible image. In transfer subsystem 50, a suitable electric field is applied to transfer the toner particles of the visible image to receiver 42 to form the desired print image having toner 38 on the receiver, as shown on receiver 42A. The imaging process is typically repeated many times with reusable photoreceptors 25.

Receiver 42A is then removed from its operative association with photoreceptor 25 and subjected to heat or pressure to permanently fix ("fuse") print image toner 38 to receiver 42A. Plural print images, e.g. of separations of different colors, are overlaid on one receiver before fusing to form a multi-color print image using toner 38 on receiver 42A.

Each receiver 42, during a single pass through the six printing modules 31, 32, 33, 34, 35, 36, can have transferred in registration thereto up to six single-color toner images to form a pentachrome image. As used herein, the term "hexachrome" implies that in a print image, combinations of various of the six colors are combined to form other colors on receiver 42 at various locations on receiver 42. That is, each of the six colors of toner can be combined with toner of one or more of the other colors at a particular location on receiver 42 to form a color different from the colors of the toners combined at that location. In an aspect, printing module 31 forms black (K) print images, printing module 32 forms yellow (Y) print images, printing module 33 forms magenta (M) print images, printing module 34 forms cyan (C) print images, printing module 35 forms light-black (Lk) images, and printing module 36 forms clear images.

In various aspects, printing module 36 forms the print image using a clear toner 38 or tinted toner 38. Tinted toners absorb less light than they transmit, but do contain pigments or dyes that move the hue of light passing through them towards the hue of the tint. For example, a blue-tinted toner coated on white paper will cause the white paper to appear light blue when viewed under white light, and will cause yellows printed under the blue-tinted toner to appear slightly greenish under white light.

Receiver 42A is shown after passing through printing module 36. The print image on receiver 42A includes unfused particles of toner 38.

Subsequent to transfer of toner 38 of the respective print images, overlaid in registration, one from each of the respective printing modules 31, 32, 33, 34, 35, 36, receiver 42A is advanced to fusing device 60, i.e. a fusing or fixing assembly, to fuse print image toner 38 to receiver 42A. Transport web 81 transports the print-image-carrying receivers (e.g., 42A) to fuser 60, which fuses the toner particles to the respective receivers 42A by the application of heat and pressure. The receivers 42A are serially de-tacked from transport web 81 to permit them to feed cleanly into fuser 60. Transport web 81 is then reconditioned for reuse at cleaning station 86 by cleaning and neutralizing the charges on the opposed surfaces of the transport web 81. A mechanical cleaning station (not shown) for scraping or vacuuming toner off transport web 81 can also be used independently or with cleaning station 86. The mechanical cleaning station can be disposed along transport web 81 before or after cleaning station 86 in the direction of rotation of transport web 81.

Fuser 60 includes a heated fusing roller 62 and an opposing pressure roller 64 that form a fusing nip 66 therebetween. Toner-image-bearing receiver 42A is fed into fusing nip 66, in which print image toner 38 is heated to a temperature in excess of its glass transition temperature ($T_g$). This softens the toner; pressure between fusing roller 62 and pressure roller 64 urges the toner to flow. This permanently fuses print image toner 38 to receiver 42A. To provide time for fusing to occur, fuser roller 62 or pressure roller 64 is typically coated with a few millimeters' thickness of an elastomer to provide compliance in fusing nip 66. In various aspects, the thickness of the elastomer is less than 3 mm to control overdrive, discussed below. In an aspect, fuser 60 also includes a release fluid application substation 68 that applies release fluid, e.g. silicone oil, to fusing roller 62. Alternatively, wax-containing toner can be used without applying release fluid to fusing roller 62.

Other aspects of fusers, both contact and non-contact, can be employed. For example, solvent fusing uses solvents to soften the toner particles so they bond with the receiver 42. Photoflash fusing uses short bursts of high-frequency electromagnetic radiation (e.g. ultraviolet light) to melt the toner. Radiant fusing uses lower-frequency electromagnetic radiation (e.g. infrared light) to more slowly melt the toner. Microwave fusing uses electromagnetic radiation in the microwave range to heat the receivers (primarily), thereby causing the toner particles to melt by heat conduction, so that the toner is fused to the receiver 42. In various example, toner is softened by radiation or solvent vapors, and then passes through a fusing nip with zero, one, or two heated fusing members, and two, one, or zero (respectively) pressure members arranged to form a fusing nip.

The receivers (e.g., receiver 42B) carrying the fused image (e.g., fused image 39) are transported in a series from fusing device 60 along a path either to a remote output tray 69, or back to printing modules 31, 32, 33, 34, 35, 36 to create an image on the backside of the receiver (e.g., receiver 42B), i.e. to form a duplex print. Receivers (e.g., receiver 42B) can also be transported to any suitable output accessory. For example, an auxiliary fuser or glossing assembly can provide a clear-toner overcoat. Printer 100 can also include multiple fusers 60 to support applications such as overprinting, as known in the art.

In various aspects, between fusing device 60 and output tray 69, receiver 42B passes through finisher 70. Finisher 70 performs various media-handling operations, such as folding, stapling, saddle-stitching, collating, and binding.

Printer 100 includes main printer apparatus logic and control unit (LCU) 99, which receives input signals from the various sensors associated with printer 100 and sends control signals to the components of printer 100. LCU 99 can include a microprocessor incorporating suitable look-up tables and control software executable by the LCU 99. It can also include a field-programmable gate array (FPGA), programmable logic device (PLD), microcontroller, or other digital control system. LCU 99 can include memory for storing control software and data. Sensors associated with the fusing assembly provide appropriate signals to the LCU 99. In response to the sensors, the LCU 99 issues command and control signals that adjust the heat or pressure within fusing nip 66 and other operating parameters of fuser 60 for receivers. This permits printer 100 to print on receivers of various thicknesses and surface finishes, such as glossy or matte.

Image data for writing by printer 100 can be processed by a raster image processor (RIP; not shown), which can include a color separation screen generator or generators. The output of the RIP can be stored in frame or line buffers for transmission of the color separation print data to each of respective LED writers, e.g. for black (K), yellow (Y), magenta (M), cyan (C), and red (R), respectively. The RIP or color separation screen generator can be a part of printer 100 or remote therefrom. Image data processed by the RIP can be obtained from a color document scanner or a digital camera or produced by a computer or from a memory or network which typically includes image data representing a continuous image that needs to be reprocessed into halftone image data in order to be adequately represented by the printer. The RIP can perform image processing processes, e.g. color correction, in order to obtain the desired color print. Color image data is separated into the respective colors and converted by the RIP to halftone dot image data in the respective color using matrices, which comprise desired screen angles (measured counterclockwise from rightward, the +X direction) and screen rulings. The RIP can be a suitably-programmed computer or logic device and is adapted to employ stored or computed matrices and templates for processing separated color image data into rendered image data in the form of halftone information suitable for printing. These matrices can include a screen pattern memory (SPM).

Various parameters of the components of a printing module (e.g., printing module 31) can be selected to control the operation of printer 100. In an aspect, charger 21 is a corona charger including a grid between the corona wires (not shown) and photoreceptor 25. Voltage source 21a applies a voltage to the grid to control charging of photoreceptor 25. In an aspect, a voltage bias is applied to toning station 23 by voltage source 23a to control the electric field, and thus the rate of toner transfer, from toning station 23 to photoreceptor 25. In an aspect, a voltage is applied to a conductive base layer of photoreceptor 25 by voltage source 25a before development, that is, before toner is applied to photoreceptor 25 by toning station 23. The applied voltage can be zero; the base layer can be grounded. This also provides control over the rate of toner deposition during development. In an aspect, the exposure applied by exposure subsystem 22 to photoreceptor 25 is controlled by LCU 99 to produce a latent image corresponding to the desired print image. All of these parameters can be changed, as described below.

During fusing, print image toner 38 behaves similarly to a hot-melt adhesive. Therefore, it can adhere to the surface of fusing roller 62. To permit separating the warm toner from fuser roller 62, release agents can be generally employed. These include materials such as silicone oils coated onto the fuser roller, or semicrystalline materials incorporated into the toner that coat the fuser roller. In various aspects, fusing roller 62 is coated with low-surface-energy elastomers, such as polyfluorinated materials or silicone rubbers.

Further details regarding printer 100 are provided in U.S. Pat. No. 6,608,641, issued on Aug. 19, 2003, to Peter S. Alexandrovich et al., and in U.S. Publication No. 2006/0133870, published on Jun. 22, 2006, by Yee S. Ng et al., the disclosures of which are incorporated herein by reference.

Figure 6:
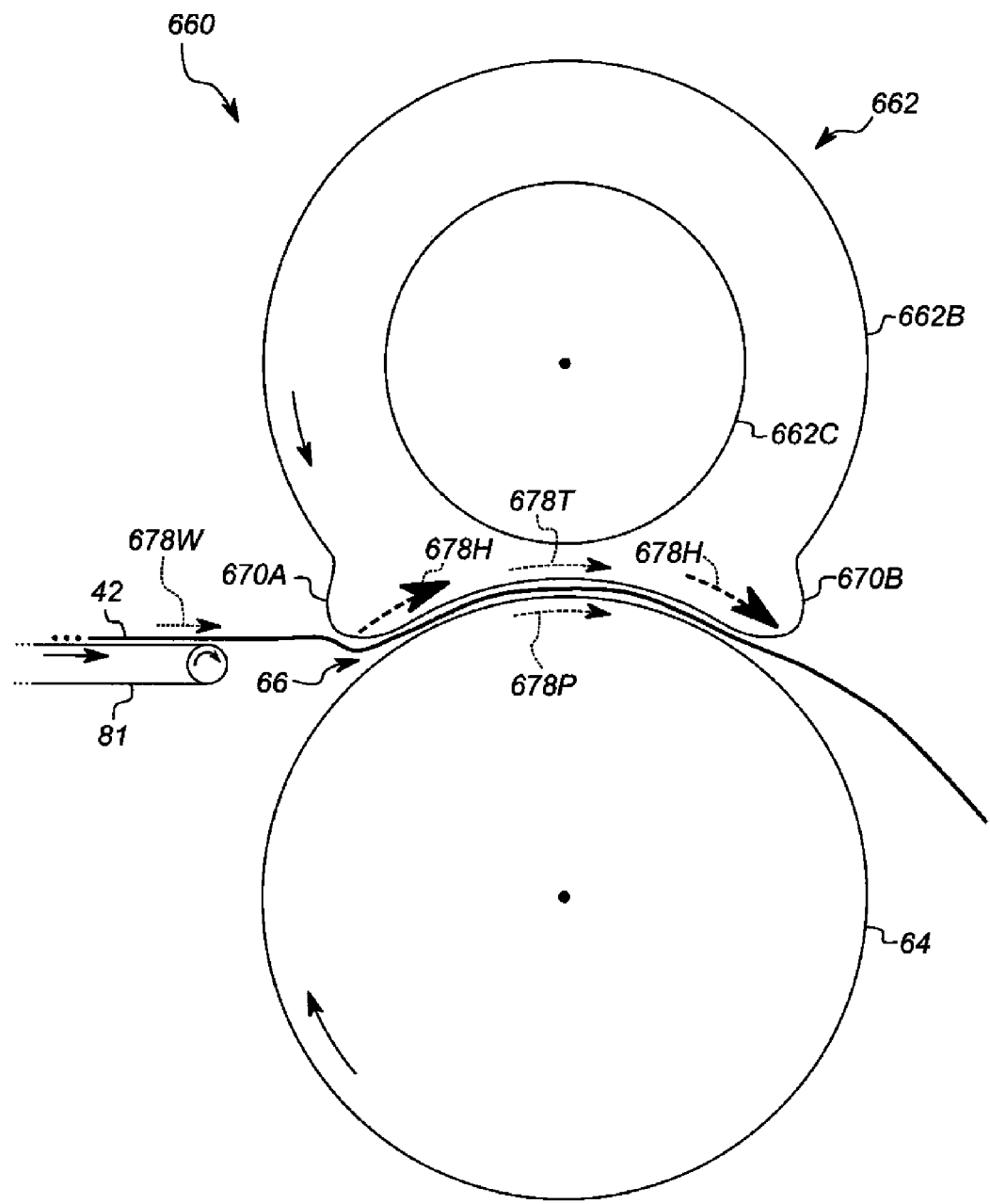
FIG. 6 is a cross-section showing an example of overdrive in a fuser.

FIG. 6 shows an example of overdrive in fuser 660. Fusing roller 662 includes rigid core 662C and compliant blanket 662B (also referred to as a "shell"). Receiver 42, pressure roller 64, fusing nip 66, and transport web 81 are as shown in FIG. 1. Rollers 662, 64 are shown spaced apart for clarity; in operation, they are pressed together. Pressure roller 64 indents blanket 662B, as shown. Transport web 81 transports receiver 42 at a transport speed represented graphically as speed 678W.

Overdrive can be a property of a fusing system, as can underdrive. Overdrive and underdrive are controlled to provide receivers 42B bearing fused images 39 (FIG. 1) that emerge from printer 100 flat, i.e., without being substantially curved, wrinkled, or skewed, or to provide receiver sheets 42B that are curved or otherwise deformed as desired. Overdrive and underdrive arise from the properties and design of the fuser.

Elastomers such as those commonly used in blanket 662B have Poisson ratios of approximately 0.48 to 0.50. This means that the elastomer is substantially incompressible when subjected to a stress. In fusing nip 66, pressure roller 64 exerts a stress on fusing roller 662, causing the elastomer of blanket 662B to deform. However, because the elastomer is incompressible, the volume of the elastomer does not change. This means that the circumference of the elastomer increases. However, the circumference cannot increase in the center of fusing nip 66 where pressure roller 64 is applying pressure. Therefore, blanket 662B bulges out to the sides of fusing nip 66, forming bulges 670A, 670B. As a result, the circumference of fusing roller 662 varies as any given point on receiver 42 passes through fusing nip 66. Therefore, when the angular velocity of fusing roller 662 is constant, fusing roller 662 drives receiver 42 with a higher circumferential speed 678H at bulges 670A, 670B and a lower circumferential speed 678T at the point of maximum compression of blanket 662B. The local increase in speed 678H at bulges 670A, 670B is known as overdrive. The magnitude of speeds 678W, 678H, 678T is represented graphically by arrow size (larger arrows represent faster linear speeds).

As a result, fusing roller 662 attempts to drive receiver 42 at various speeds 678H, 678T, 678H while receiver 42 passes through fusing nip 66. At the same time, pressure roller 64 attempts to drive receiver 42 at speed 678P, which can be equal to speed 678T or not. In various aspects, a portion of receiver 42 remains engaged with transport web 81 (e.g., electrostatically held thereto) while receiver 42 enters fusing nip 66, so transport web 81 attempts to drive receiver 42 at speed 678W, which can be equal to speed 678T or not. Therefore, different parts of the receiver, which can be largely incapable of stretching, can simultaneously be driven at a variety of different speeds.

The stresses resulting from overdrive, the drive of some portions of the receiver faster than others, can tear the receiver. The receiver can also slip either before or in the fusing nip 66, since it is positively engaged at two separate speeds (e.g., speeds 678H, 678P; or speeds 678W, 678H), and one driving member can overcome another. This can result in receiver 42 skewing in the printer if it slips off one side but not another. If receiver 42 slips one place but not another, the net force on a portion of receiver 42 can be angular or skewing, causing receiver 42 to crinkle. If receiver 42 slips in fusing nip 66, the toner on receiver 42 can smear, damaging the image or other toner pattern on receiver 42. When passing multiple receivers 42 through a nip to form a laminate, the warm toner between pair of receivers 42 can act as a lubricant and permit the receivers 42 to slip with respect to each other, causing misalignment of the structure.

Overdrive can also introduce curl in the receiver. This curl tends to steer receiver 42B (FIG. 1) out of the plane of receiver 42A (FIG. 1) entering fusing nip 66. In the example shown, as receiver 42 leaves fusing nip 66, it is being driven faster by fusing roller 662 (speed 678H) than by pressure roller 64 (speed 678P). This causes receiver 42 to curve towards pressure roller 64.

Figure 7:
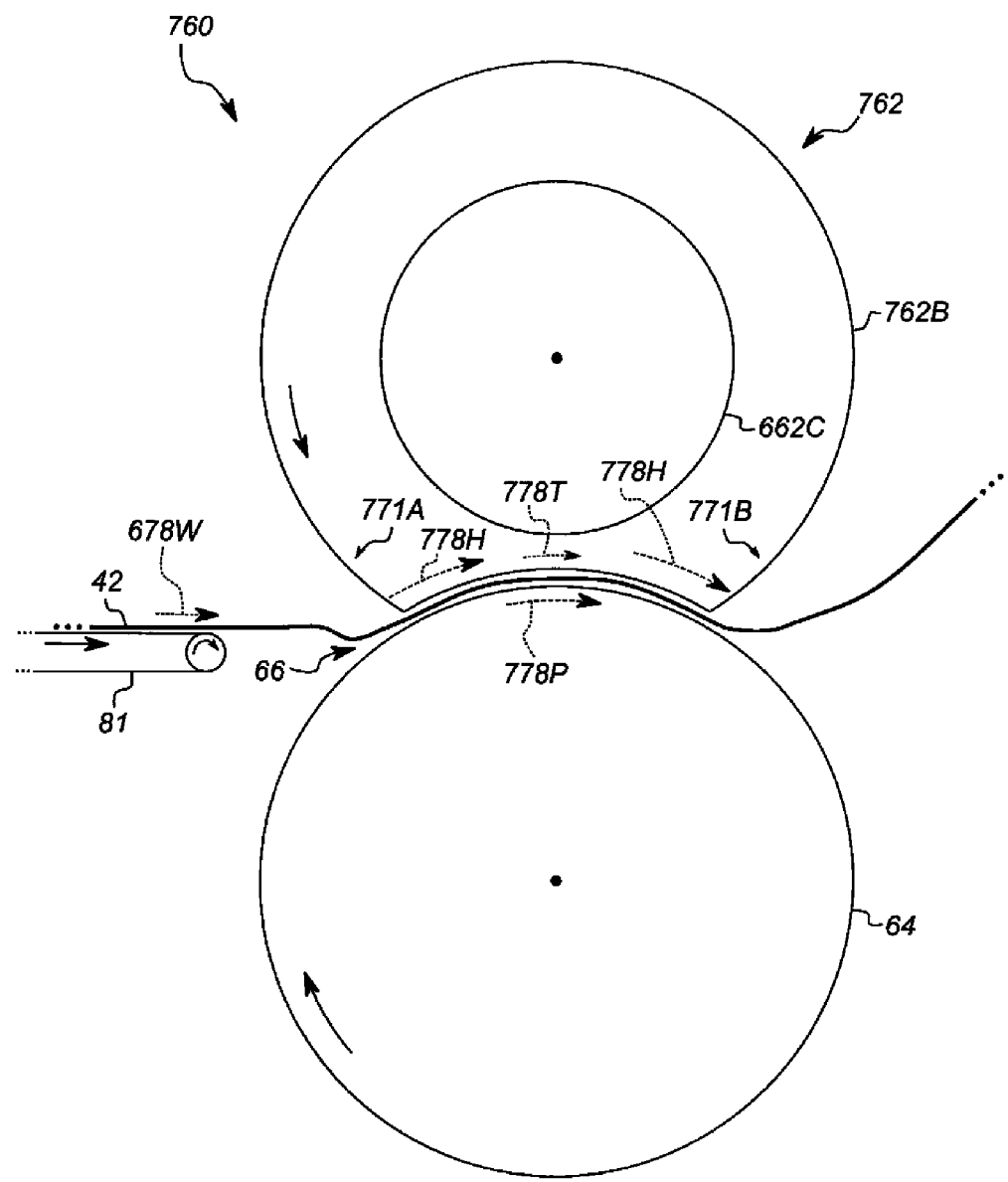
FIG. 7 is a cross-section showing an example of underdrive in a fuser.

FIG. 7 shows an example of underdrive in fuser 760. Rigid core 662C, fusing nip 66, pressure roller 64, transport web 81, receiver 42, and speed 678W are as shown in FIG. 6. Fusing roller 762 includes rigid core 662C and blanket 762B. Blanket 762B is formed from a highly compressible material, such as a highly compressible foam, with a Poisson ratio that range from slightly negative (e.g., cork) to relatively small (e.g., 0.1), e.g., a Poisson ratio from −0.1 to +0.2. In those instances, volume compression upon application of a stress causes the circumference to decrease. This can lead to underdrive. In this example, pressure roller 64 attempts to drive receiver 42 at speed 778P, which can be equal to speed 678W. In regions 771A, 771B, unlike in FIG. 6, there is no bulge. Fusing roller 762 therefore attempts to drive receiver 42 at speed 778H, which can be equal to speed 678W. Where blanket 762B is most compressed, however, fusing roller 672 attempts to drive receiver 42 at speed 778T, less than speed 778H. This condition is referred to as underdrive, and can cause similar stress-related damage or alteration to receiver 42. Underdrive can also introduce curl in receiver 42. In the example shown, if speed 778P is greater than speed 778H where receiver 42 exits fusing nip 66, receiver 42 will be bent towards fixing roller 762.

In various aspects not shown, if the Poisson ratio of a blanket on a fixing roller is 0.25-0.35, the volume compression is such that the circumference of the fixing roller does not substantially change and neither overdrive nor underdrive occurs. Some foams have this property, as well as numerous harder materials such as many ceramics. In various examples described below that use underdrive or overdrive deliberately, the Poisson ratio is less than 0.25 or greater than 0.35, respectively.

Variations in overdrive, such as can occur if the pressure across fusing nip 66 varies (e.g., because of varying toner stack height), can cause receiver 42 to buckle or crease, resulting in damage to, or physical alteration of, receiver 42. Various aspects using overdrive and underdrive to produce desired effects are described below with reference to FIG. 9.

Figure 2:
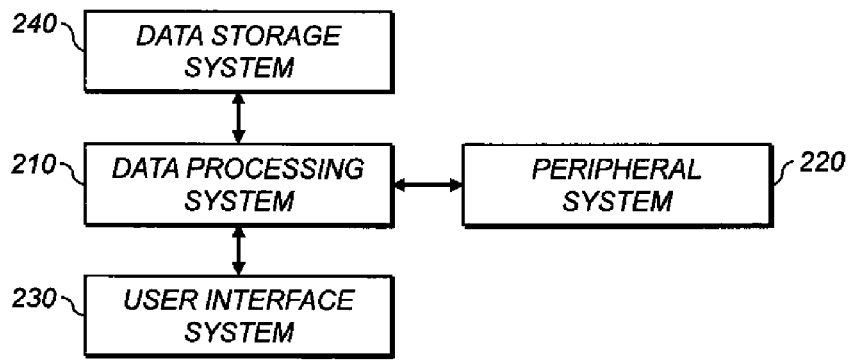
FIG. 2 is a high-level diagram showing the components of a processing system useful with various aspects.

FIG. 2 is a high-level diagram showing the components of a processing system useful with various aspects. The system includes a data processing system 210, a peripheral system 220, a user interface system 230, and a data storage system 240. Peripheral system 220, user interface system 230 and data storage system 240 are communicatively connected to data processing system 210.

Data processing system 210 includes one or more data processing devices that implement the processes of various aspects, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Data storage system 240 includes one or more processor-accessible memories configured to store information, including the information needed to execute the processes of the various aspects, including the example processes described herein. Data storage system 240 can be a distributed processor-accessible memory system including multiple processor-accessible memories communicatively connected to data processing system 210 via a plurality of computers or devices. On the other hand, data storage system 240 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data can be communicated. The phrase "communicatively connected" is intended to include a connection between devices or programs within a single data processor, a connection between devices or programs located in different data processors, and a connection between devices not located in data processors at all. In this regard, although the data storage system 240 is shown separately from data processing system 210, one skilled in the art will appreciate that data storage system 240 can be stored completely or partially within data processing system 210. Further in this regard, although peripheral system 220 and user interface system 230 are shown separately from data processing system 210, one skilled in the art will appreciate that one or both of such systems can be stored completely or partially within data processing system 210.

Peripheral system 220 can include one or more devices configured to provide digital content records to data processing system 210. For example, peripheral system 220 can include digital still cameras, digital video cameras, cellular phones, or other data processors. Data processing system 210, upon receipt of digital content records from a device in peripheral system 220, can store such digital content records in data storage system 240. Peripheral system 220 can also include a printer interface for causing a printer to produce output corresponding to digital content records stored in data storage system 240 or produced by data processing system 210.

User interface system 230 can include a mouse, a keyboard, another computer, or any device or combination of devices from which data is input to data processing system 210. In this regard, although peripheral system 220 is shown separately from user interface system 230, peripheral system 220 can be included as part of user interface system 230.

User interface system 230 also can include a display device, a processor-accessible memory, or any device or combination of devices to which data is output by data processing system 210. In this regard, if user interface system 230 includes a processor-accessible memory, such memory can be part of data storage system 240 even though user interface system 230 and data storage system 240 are shown separately in FIG. 2.

Figure 4:
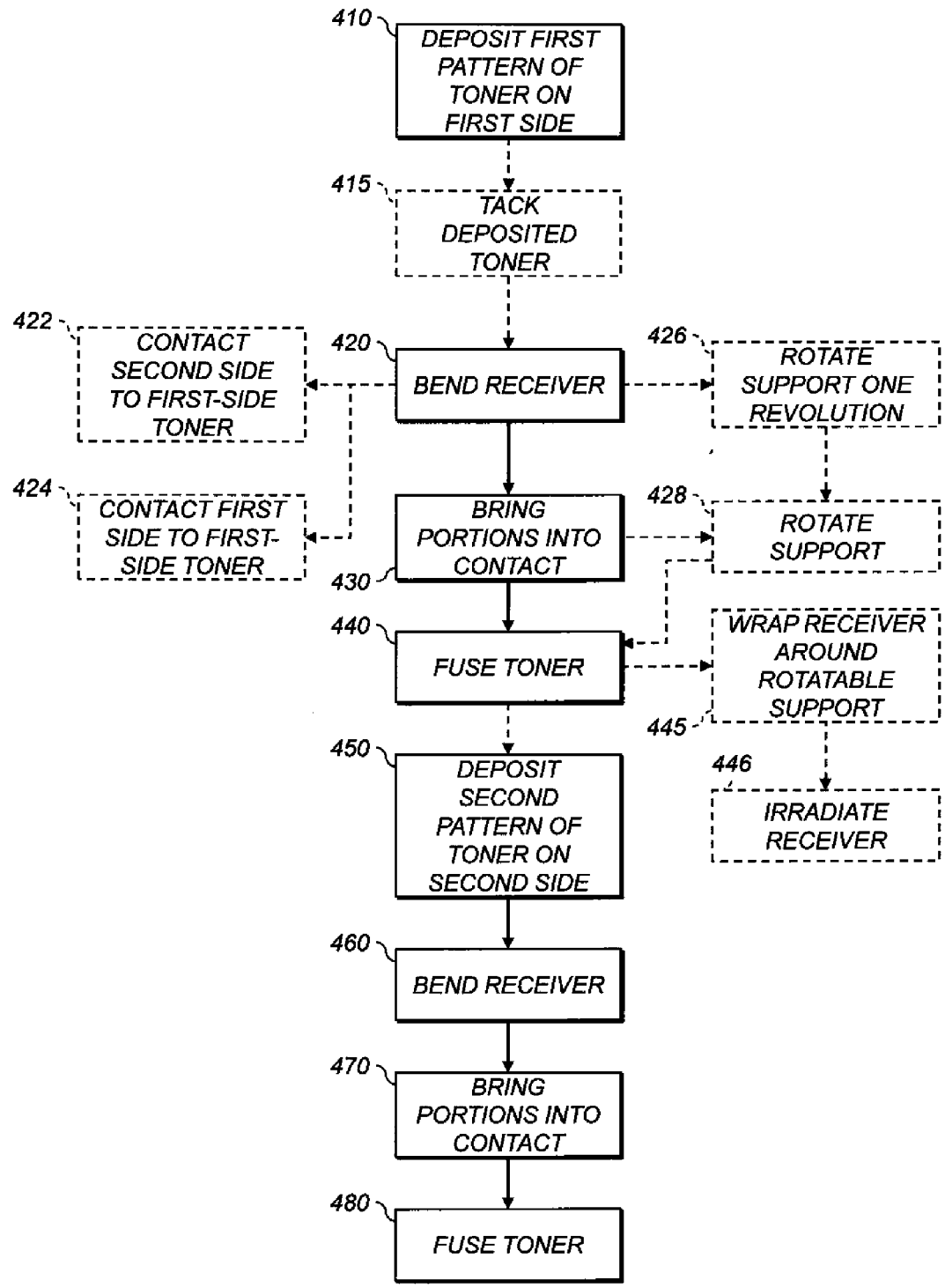
FIGS. 4 and 5 show methods of forming three-dimensional structures.

FIG. 4 shows methods for forming three-dimensional structures, e.g., corrugated or composite structures. Three-dimensional structures can be made using flexible receiver substrates such as paper, sheet metal, plastics, cloth, and wood veneer. The receiver is sufficiently flexible to permit wrapping or folding the receiver to transform the receiver from a substantially planar form to a form extending significantly in three dimensions, such as a cylinder, ellipse, or oval, or other three-dimensional forms having variable radii of curvature. Three-dimensional structures with folds can have rectangular, triangular, or other polyhedral shapes, and can include Z-fold shapes in which the receiver is folded back onto itself. Processing begins with step 410. The term "side" is used in FIG. 4 for conciseness. In this disclosure, "side" and "surface" are used interchangeably when referring to an area or face of a receiver on which toner can be deposited.

In step 410, a first pattern of thermoplastic toner particles is deposited onto a first surface of a receiver. The toner particles are deposited to form a plurality of spaced-apart stacks, columns, or rows of toner particles, rather than a solid layer. The toner particle stacks extend above the first surface (or "side," and likewise throughout) of the receiver. Step 410 is followed by step 420 or optional step 415.

In optional step 415, the first pattern of deposited toner particles is tacked to the first surface of the receiver. Tacking can be accomplished by any of the ways described above of fusing, except that the toner is not pressed firmly to the receiver. In an example, tacking includes raising the temperature of the toner to just above $T_g$ for a short period of time without applying pressure to the toner. The resulting softening of the toner helps to adhere the toner particles to each other. Step 415 is followed by step 420.

In step 420, the receiver is bent or creased so that non-overlapping first and second portions of the receiver are defined. As used herein, "bending" does not require creasing or plastic deformation. Elastically deforming a receiver into a tube, for example, is included in the term "bending." FIG. 11B shows an example of receiver 42 bent at fold line 1717. First portion 1701 and second portion 1702 are defined. Returning to FIG. 4, in various aspects, the bending step is advantageously performed so that the normal to the plane of the surface varies continuously at each point on the surface other than the edges of the surface. The resulting member can be circular, ellipsoidal, or another shape without folds. The receiver can be bent to form a closed surface that fully encloses a volume (e.g., a sphere), an open surface that does not fully enclose a volume (e.g., a section of a paraboloid), or a partially-closed surface (e.g., a cylinder with open ends).

Step 420 is followed by step 430, and can include optional steps 422, 424, or 426. In aspects using step 426, a rotatable support is provided, as discussed below with reference to step 445. Step 420 further includes bringing a second surface of the receiver into contact with the rotatable support. Step 426 follows. In step 426, which is a first-rotation step, the support is rotated through one revolution to wind at least the first portion of the receiver onto the support. Step 426 is followed by step 428.

Figure 12A:
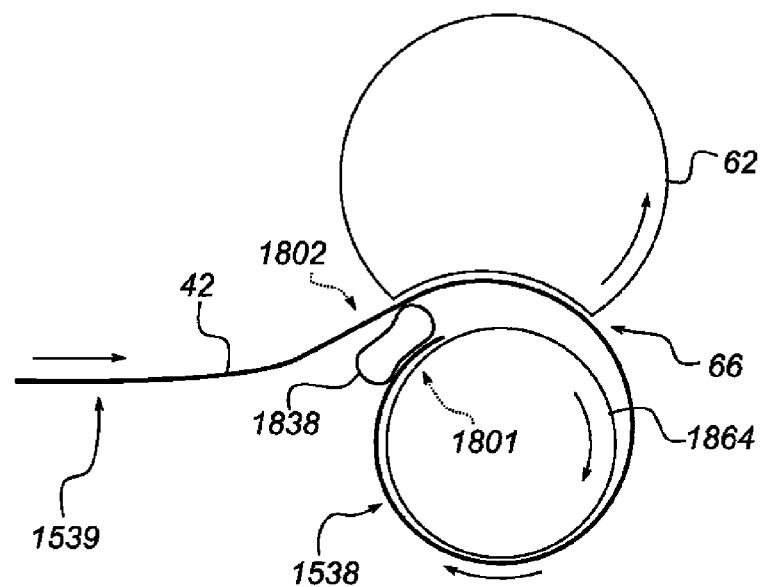
FIGS. 12A-12B show the preparation of an exemplary three-dimensional structure.

In step 428, which is a subsequent-rotation step that is part of step 430, the support is rotated so that at least the second portion of the receiver is wound onto the support. At least some of the second surface of the receiver in the second portion contacts at least one of the stacks of toner particles on the first surface of the receiver in the first portion. In this manner the toner faces outward while winding and can be used, e.g., for forming structural members such as Z-folds. An example is shown in FIG. 12A: first portion 1801 is wound on rotatable support 1864. Second portion 1802 of receiver 42 is then wound onto rotatable support 1864. Second surface 1539 of receiver 42 contacts toner 1838, which is on first surface 1539 in portion 1801.

Returning to FIG. 4, in various aspects, the support is a rotatable member, e.g., a mandrel, mounted at one end, e.g., cantilevered. This permits forming three-dimensional structures folded over onto themselves and bonded to form closed structures, e.g., tubes. The formed tube can be slid off the free end of the cantilevered support. In various aspects, the support is mounted at both ends, and the mounting(s) at one or both end(s) of the support are removable. This permits the three-dimensional structure to be slid off the support once pressure is removed and the nip opened.

Figure 10:
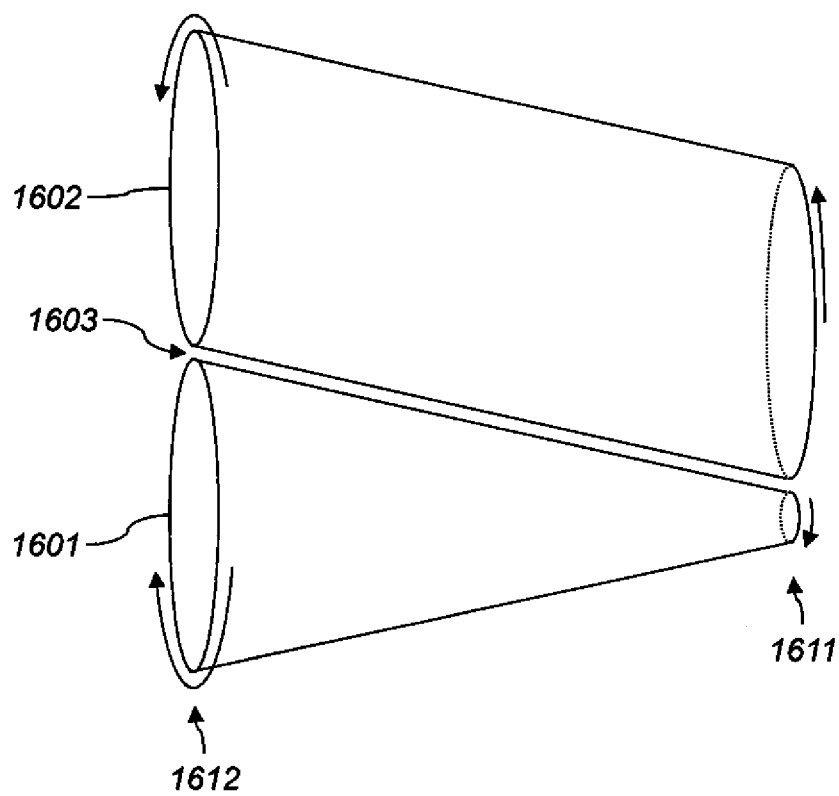
FIG. 10 shows rollers that are not right cylinders according to various aspects.

Referring to FIG. 10, cylindrically symmetric mandrels can include structures other than simple right cylinders. Thus, mandrels having shapes such as cones can also be used. In the example shown, conical roller 1601 and cylindrical roller 1602 are arranged to form nip 1603 between them. In various aspects, a receiver (not shown) is wound around conical roller 1601 as it exits nip 1603. The three-dimensional structure formed therefore has a generally conical shape. The structure can alternatively have a conical hollow core and a non-conical shape outside.

In various aspects, conical roller 1601 is a rigid pressure roller, and cylindrical roller 1602 is an elastomeric or elastomeric-coated fixing roller (e.g., as shown in FIG. 6). A receiver (not shown) is passed through nip 1603. At little end 1611 of conical roller 1601, the radius of curvature of the pressure roller is smaller, and the pressure (force per unit area) is higher, than at big end 1612. This leads to more overdrive at little end 1611 than at big end 1612. The higher overdrive and the smaller radius at little end 1611 cause the receiver at little end 1611 to bend more sharply than at big end 1612, resulting in conical curling of the receiver as it exits nip 1603.

Returning to FIG. 4, step 428, which is part of step 430, is followed by step 440.

In optional step 422, which is part of bending step 420, a second surface of the receiver is brought into contact with at least one of the fused toner particle stacks on the first surface of the receiver. This step permits making tubes and other wrapped shapes. An example of this is shown in FIG. 12A, discussed below.

Figure 14:
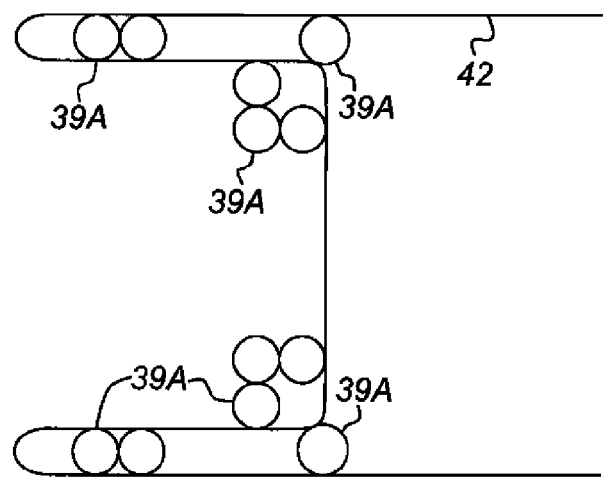
FIG. 14 is cross-section of an example I-beam pseudo-extrusion.

Returning to FIG. 4, in optional step 424, which is part of bending step 420, the first surface of the receiver is brought into contact with at least one of the fused toner particle stacks on the first surface of the receiver. This permits forming folds, paper-airplane shapes, or other folded shapes. When making paper-airplane shapes, toner can be deposited longitudinally, e.g., to seal the halves of the fuselage together. Toner can be deposited transversely, e.g., to stiffen the wings and reduce droop. This also permits making pseudo-extrusions, e.g., I-beams. A cross-section of an example I-beam pseudo-extrusion is shown in FIG. 14, in which areas of fused toner 39A hold receiver 42 in the I-beam shape.

Returning to FIG. 4, in step 430, at least part of a surface of the receiver in the second portion is brought into contact with the deposited stacks of toner particles. This can be either a front or a back surface of the receiver (for planar receivers). The deposited toner is therefore arranged between two portions of the receiver. The receiver can be bent (step 420) like a book, so that the toner is arranged in contact with two portions of the same surface. The receiver can also be bent (step 420) like a tube, so that toner is arranged between the front surface and the back surface, wrapped around to meet the toner. An example of a receiver bent like a tube is shown in FIG. 12A. Toner 1838 holds first surface 1538 of receiver 42 to second surface 1539 of receiver 42. Returning to FIG. 4, step 430 is followed by step 440. As discussed above, step 430 can include optional step 428.

In step 440, at least some of the toner particles are fixed (fused) to bind the second portion to the first portion and provide a selected spacing between the first portion and the second portion. The toner stack height and spacing can be set, or varied either continuously or in a discrete fashion to provide a selected spacing between the first and second portions of the receiver. This permits controlling the stiffness and flexibility of the three-dimensional structure while forming it. In an example of a load-bearing three-dimensional structure, columnar toner stacks are deposited relatively close together. In an example of a shear-resistant structure, the heights of the toner stacks are relatively larger than those in three-dimensional structures not designed to be shear-resistant (e.g., moldable laminate structures, which need to be bendable after they are formed, or laminate structures intended to be curved into columns or curved panels; even if the laminate resists shear after molding or curving, the laminate before those operations is not designed to be shear-resistant). The amount of toner can be adjusted depending on a desired use of the three-dimensional structure, to control the strength-to-weight ratio of the structure. Step 440 can optionally be followed by step 450, and can include optional step 445.

Stiffness is the proportionality between the deflection and the applied stress along a given direction, prior to the onset of buckling. For an anisotropic material such as paper, the stiffness along the short- and long-grain axes can differ. Stiffness is a characteristic of an elastic response. As long as buckling has not occurred, once the applied stress is removed, the deflection ceases to exist.

In optional step 445, which is part of fuse toner step 440, the receiver is progressively wrapped around a rotatable support. The rotatable support can be a mandrel. The wrapping starts at an entry point defined with respect to the support. In the vicinity of the entry point there can be clamps, a recess, a recess with a member to retain the leading edge of the receiver, guide skis, vacuum ports within the rotatable support, an air knife that blows the receiver towards the rotatable support, an electrostatic hold down to hold the receiver on the rotatable support, or other ways of causing the receiver to conform to the rotatable support. The receiver can be wrapped tightly around the rotatable support, or can contact the rotatable support in only a specified region of the rotatable support so that the resulting 3-dimensional structure has a radius of curvature that is greater than that of the rotatable support. The rotatable support can be rigid and can be made of metal, ceramic, or wood. A thin layer (less than 2 mm thick) of a polymeric substrate can coat the rotatable support to provide desired frictional, adhesional, electrical resistivity, or triboelectric properties. In various aspects, the support is a drum mounted at one end. In various aspects, the support is a rotatable member mounted at one end, and the cross-section of the rotatable member varies along its length. In an example, the support member is substantially conical, e.g., is substantially a cone or truncated cone, and is mounted at the end near the base (wide portion) of the cone, as shown in FIG. 10. This imparts a conical shape to at least a portion of the three-dimensional structure, as discussed below.

While the receiver is being wrapped around the support, the toner is being softened at or near the entry point. Softening can be performed as fusing, described above with reference to FIG. 1, only with less energy input or solvent exposure. At least one of the deposited stacks of toner is softened at a time. Solvents can be used, or fusing energy (e.g., heat or radiation) can be provided to heat the toner above $T_g$. Further examples of this are discussed below with reference to FIG. 9A. In various examples, the whole pattern is deposited on the receiver, and then the receiver is wrapped and fused to form the three-dimensional structure.

In various aspects, step 440 includes passing the receiver through a fusing nip. The nip is defined by the rotatable support and a rotatable nip-forming member, e.g., a fusing roller or pressure roller as discussed above with reference to FIG. 1, which press or are pressed against each other. The support and the nip-forming member have respective radii and respective Young's moduli. The fusing roller can have a compliant elastomeric coating having a Young's modulus of less than 30 MPa and being at least 5 mm thick. Fusing can be done by heating the toner with the nip-forming member to a temperature in excess of $T_g$ while applying pressure between the support and the nip-forming member. Because of the thickness of the elastomeric coating on the fuser roller, at least some heat can be supplied to the external surface of the fuser roller using an external heating source such as a heater roller. The fuser roller can also be heated using internal heating sources such as heat lamps or resistance wires.

Step 445 can include step 446. In step 446, the receiver is irradiated in or upstream of the entry point to provide fusing energy to raise the temperature of the toner. This provides non-contact fusing in which successive turns of the receiver wrap around the rotatable member and are glued together by the warmed toner. In various aspects, the temperature of the toner is raised above $T_g$.

In various aspects, step 440 is followed by step 450. These aspects can be used to produce Z-folded structures.

In step 450, a second pattern of thermoplastic toner particles is deposited onto a second surface of the receiver to form a second plurality of spaced-apart stacks of toner particles (not a solid layer) that extend above the second surface of the receiver. This can be done as discussed above with reference to step 410. Step 450 is followed by step 460.

In step 460, the receiver is bent or creased so that non-overlapping third and fourth portions of the receiver are defined. The portions can be any size. This can be done as discussed above with reference to step 420. An example of third and fourth portions 1703, 1704, respectively, is shown in FIG. 11D. Returning to FIG. 4, step 460 is followed by step 470.

In step 470, at least part of the second surface of the receiver in the fourth portion is brought into contact with the deposited stacks of toner particles on the second surface. This can be done as discussed above with reference to step 430. As shown, sheet receivers can be turned over for this step, or toner can be deposited duplex. Step 470 is followed by step 480.

In step 480, the toner particles are fused to bind the fourth portion to the third portion and provide a selected spacing between the third portion and the fourth portion.

Figure 11E:
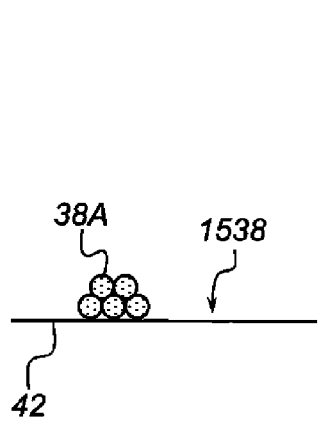
Figure 11E:
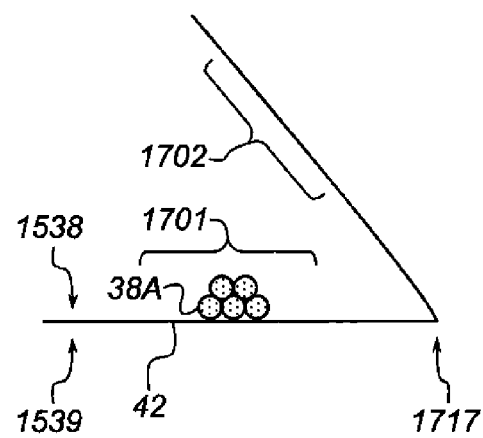
Figure 11E:
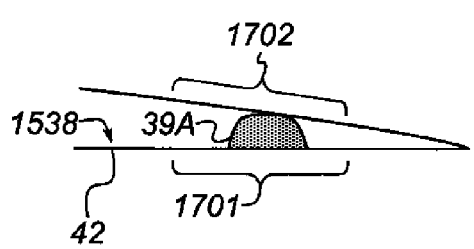
Figure 11E:
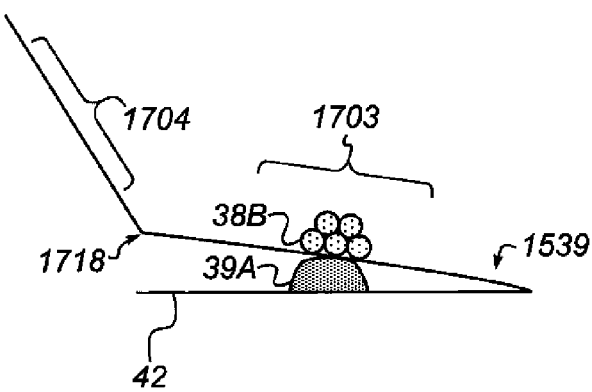
Figure 11E:
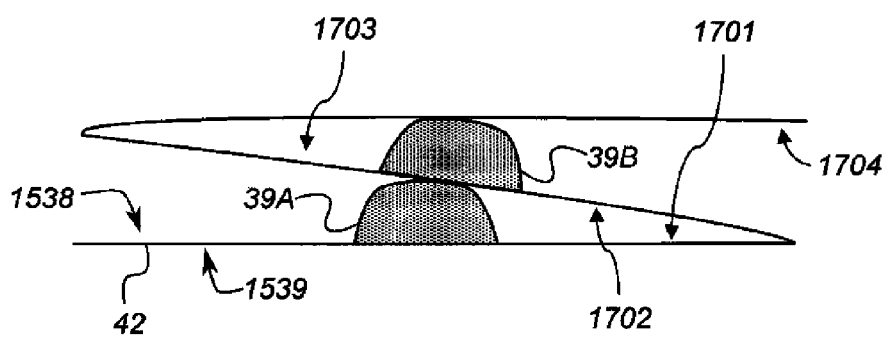

FIGS. 11A-11E show side views of an example of various steps in the production of a three-dimensional structure. FIG. 11A shows unfused toner 38A deposited on first surface 1538 of receiver 42 (step 410, FIG. 4). FIG. 11B shows receiver 42 folded like a book along fold line 1717 (step 420, FIG. 4). First portion 1701 and second portion 1702 are thus defined. First surface 1538 and opposing second surface 1539 are shown. FIG. 11C shows fused toner 39A holding first portion 1701 and second portion 1702 of first surface 1538 of receiver 42 together (step 440, FIG. 4).

Referring to FIG. 11D, subsequently, unfused toner 38B is deposited on second surface 1539, which previously had no toner (step 450, FIG. 4). FIG. 11D also shows receiver 42 folded like a book along fold line 1718, but the other way (steps 460, 470 in FIG. 4). This defines third portion 1703 and fourth portion 1704 of surface 1539 of receiver 42. FIG. 11E shows fused toner 39B holding third portion 1703 and fourth portion 1704 of second surface 1539 of receiver 42 together (step 480, FIG. 4). The result is a Z-folded three-dimensional structure with three layers of receiver 42 bonded by two masses of fused toner 39A, 39B.

In an example, toner patterns are arranged to form a tubular three-dimensional structure. Toner patterns are deposited on the inside surface of the first and various subsequent turns of the receiver about the rotatable support so that a continuous spiral is formed that is exposed to a hollow core of the structure. This spiral can serve, for example, as rifling on a blow gun. In other examples, patterns of toner are not exposed to the hollow core of the structure, but the wrapping of the receiver is controlled so that the edges of the receiver as it wraps form spirals, e.g., for rifling.

Figure 5:
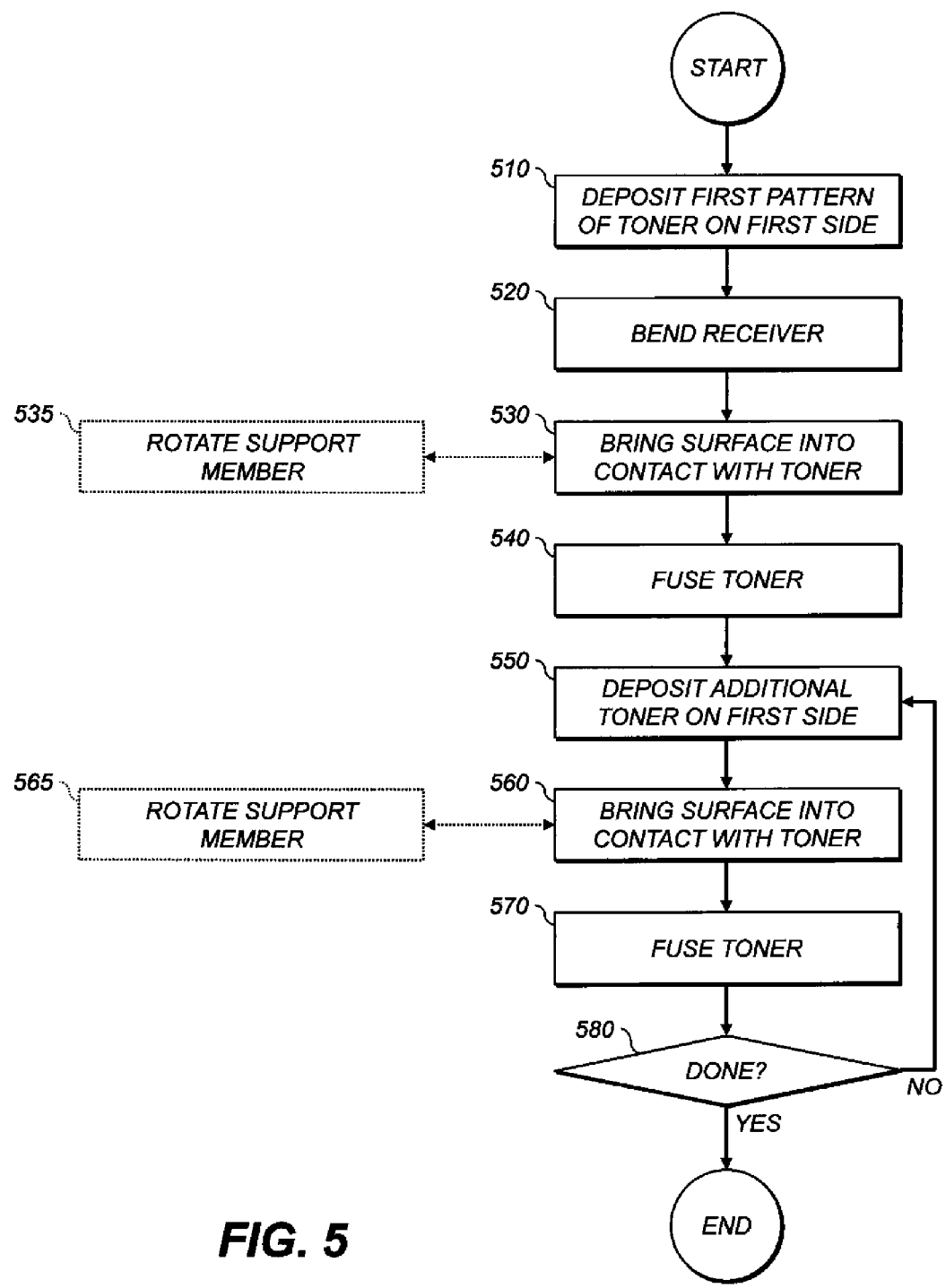

FIG. 5 shows methods for forming three-dimensional structures. These methods can build three-dimensional structures incrementally. Processing begins with step 510.

In step 510, a first pattern of thermoplastic toner particles is deposited onto a first surface of a receiver to form a plurality of spaced-apart stacks of toner particles (not a solid layer) that extend above the first surface of the receiver. This is as described above with reference to step 410. Step 510 is followed by step 520.

In step 520, the receiver is bent or creased so that non-overlapping first and second portions of the receiver are defined, e.g., as above (step 420). The first and second portions can be any size. Bending can be performed so that the normal to the plane of the surface varies continuously at each point on the surface other than the edges of the surface, as discussed above. Step 520 is followed by step 530.

In step 530, which is a first bringing-into-contact step, at least part of a surface of the receiver in the second portion is brought into contact with the deposited stacks of toner particles. As above (step 430), the toner can be arranged between two portions of the same surface, or respective portions of different surfaces. Step 530 is followed by step 540.

In step 540, which is a first fusing step, at least some of the toner particles are fused to bind the second portion to the first portion and provide a selected spacing between the first portion and the second portion. The receiver is progressively wrapped around a rotatable support starting at an entry point defined with respect to the support, as discussed above. Wrapping is done while softening the toner at the entry point using solvents or heat, as discussed above with reference to steps 445 and 446. Step 540 can include irradiating the receiver in or upstream of the entry point to provide fusing energy to raise the temperature of the toner. Step 540 is followed by step 550.

In step 550, which is a second depositing step, after the first fusing step (step 540), additional thermoplastic toner particles are deposited onto the first surface of the receiver to form additional spaced-apart stacks of toner particles extending above the first surface of the receiver in a third portion of the receiver. The third portion can be disconnected from the first or second portion over the surface of the receiver. Step 550 is followed by step 560.

In step 560, which is a second bringing-into-contact step, at least part of a surface of the receiver in a fourth portion of the receiver is brought into contact with the additional deposited stacks of toner particles. This surface can be either the front or the back. Step 560 is followed by step 570.

In step 570, which is a second fusing step, at least some of the additional toner particles are fused to bind the at least part of the surface of the receiver in the fourth portion of the receiver to the first surface of the receiver in the third portion of the receiver. Step 570 can include irradiating the receiver in or upstream of the entry point to provide fusing energy to raise the temperature of the toner. Step 570 is followed by decision step 580.

Decision step 580 decides whether the three-dimensional structure is complete. If not, the next step is step 550. The second depositing step, the second bringing-into-contact step, and the second fusing step are repeated to form the three-dimensional structure having multiple spaced-apart fused-toner bonds between portions of the receiver.

In various aspects, each of steps 540 and 570 includes passing the receiver through a fusing nip and wrapping the receiver around a rotatable support member that forms the nip. This is as discussed above with reference to FIG. 4. Step 530 includes rotate support member step 535. In these aspects, step 560 includes rotate support member step 565.

In step 535, the rotatable support member is driven in a first direction (e.g., clockwise). The receiver is entrained around the rotatable support member and toner particles on the first surface of the receiver in the first portion are brought into contact with the second surface of the receiver in the second portion. The toner particles can be unfused, tacked, or fused when they contact the second surface of the receiver.

In step 565, the rotatable support member is driven opposite the first direction (e.g., is driven counterclockwise) so that toner particles on the first surface of the receiver in the third portion are brought into contact with the first surface of the receiver in the fourth portion. The toner particles can be unfused, tacked, or fused when they contact the fourth surface of the receiver. As a result, after the second fusing step, the fused toner particles hold the first and second surfaces of the receiver together and the fused additional toner particles hold two regions of the first surface together. This provides Z-folded three-dimensional structures that can readily be built by repeated toning and fusing.

In various aspects, while repeating steps (decision step 580 determined that the three-dimensional structure was not complete), the rotatable support member is successively driven in opposite directions. The fused toner on either the first or second surface in each portion of the receiver thus adheres to the corresponding surface of the receiver in an adjacent portion. In various aspects, while the rotatable support member changes its direction of rotation, the receiver backs up in its transport path, and then advances again. In some of these aspects, toning occurs after the backup has happened.

As discussed above, in various aspects, the support is a drum mounted at one end. In various aspects, the support is a rotatable member mounted at one end, and the cross-section of the rotatable member varies along its length (e.g., a cone or truncated cone). In various aspects, bending step 520 is performed so that the normal to the plane of the surface varies continuously at each point on the surface other than the edges of the surface.

Figure 12B:
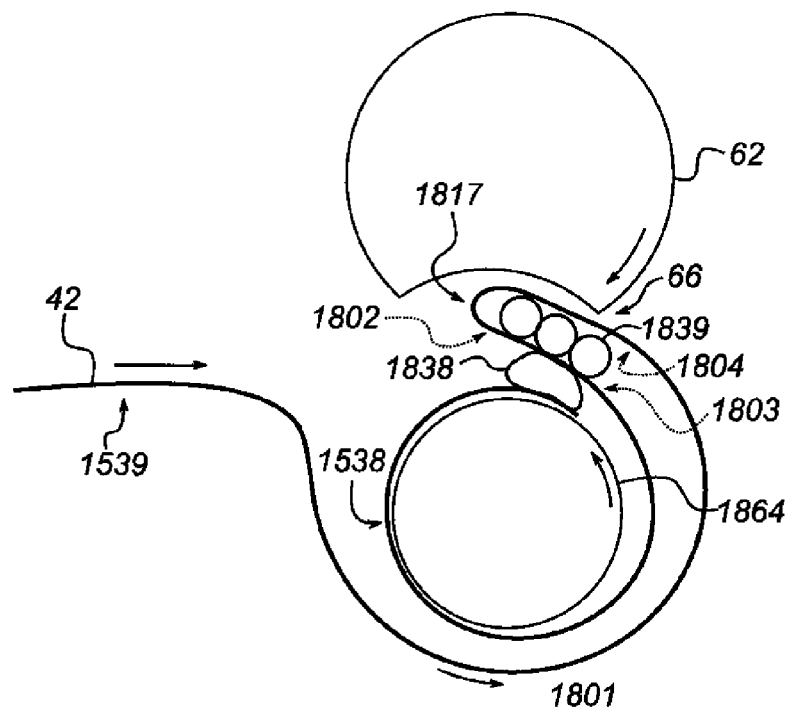

FIGS. 12A and 12B show side views of an example of various steps in the production of a three-dimensional structure. FIG. 12A shows toner 1838 deposited on first surface 1538 of receiver 42 (step 410, FIG. 4). Receiver 42 has been passed through fusing nip 66 and wrapped around rotatable support member 1864. Fusing nip 66 is formed by rotatable support member 1864 and fusing roller 62. Belts can also be used instead of rollers. Fusing roller 62 is shown indented; in this example, fusing roller 62 has a compliant cover that is indented by pressure from support member 1864. Receiver 42 has been wrapped around support member 1864 while member 1864 rotates clockwise (the first direction). Toner 1838 on first surface 1538 in first portion 1801 (shown with a dotted lead line for clarity; see step 550, FIG. 5) of receiver 42 is in contact with second surface 1539 in second portion 1802 (also shown dotted) of receiver 42 (step 560, FIG. 5). In this example, toner 1838 has already been tacked to first surface 1538. In other examples, toner 1838 can include unfused toner particles. As support member 1864 continues to rotate clockwise, toner 1838 is drawn through fusing nip 66, adhering surface 1538 in region 1801 to surface 1539 in region 1802 using toner 1838 (step 570, FIG. 5).

FIG. 12B shows support member 1864 being driven opposite the first direction, i.e., counterclockwise (in this example). This is as described above in step 565 (FIG. 5). Fusing roller 62 is also being driven opposite its direction of rotation in FIG. 12A. First surface 1538 and opposing second surface 1539 are as shown in FIG. 12A.

Receiver 42 with toner 1838 in contact with second region 1802 has been drawn back into fusing nip 66, but this time from the right rather than from the left. Before or during counterclockwise rotation, toner 1839 was deposited on first surface 1538 of receiver 42. Receiver 42 has been folded or bent at fold line 1817 (step 560, as described above). This can be done by maintaining tension on receiver 42 and permitting toner 1838 to pull second portion 1802 with it. The pulling force from toner 1838 and the tension force are in opposite directions and will result in folding or bending of the paper as support member 1864 rotates counterclockwise. Third portion 1803 and fourth portion 1804 are thus defined (shown with dotted arrows for clarity). Toner 1839 on first surface 1538 in third portion 1803 is brought into contact with first surface 1538 in fourth portion 1804. After fusing, toner 1839 holds portions 1803, 1804 together. Toner 1838 holds portions 1801, 1802 together, resulting in a Z-folded three-dimensional structure with three layers of receiver 42 bonded by two masses of fused toner 1838, 1839.

In both FIGS. 12A and 12B, receiver 42 is moving rightward at the leftmost point shown. That is, receiver 42 is being taken up by (wound onto) rotatable support 1864. However, as mentioned above, in between the states shown in FIGS. 12A and 12B, receiver 42 can back up, i.e., move left at the leftmost point shown. If support member 1864 shown in FIG. 12A reverses direction, receiver 42 will be driven to back up until toner 1838 has reached approximately the 9 o'clock position with respect to support member 1864. After that, as support member 1864 continues to rotate, receiver 42 will be taken up thereon.

Figure 9A:
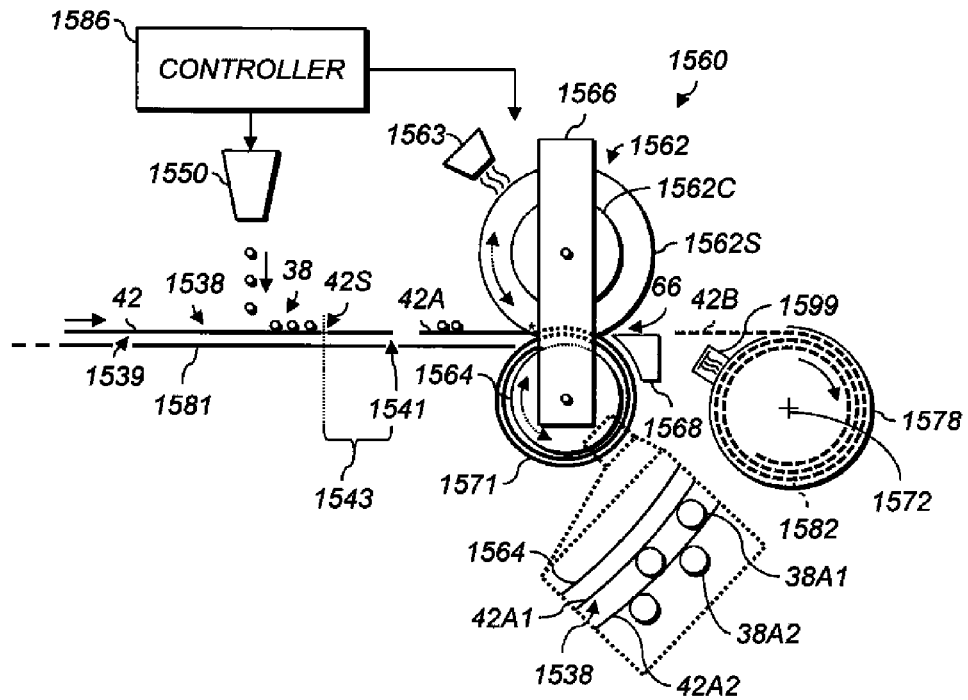
FIG. 9A is a side elevation of apparatus for producing a three-dimensional structure.

FIG. 9A is a side elevation of apparatus for producing a three-dimensional structure from a receiver 42 having leading edge 1541, first surface 1538, and opposed second surface 1539. Leader 1543 is a toner-free area adjacent leading edge 1541. A transport (not shown) moves receiver 42 along a paper path (not shown), also called a "transport path." In the example shown, the transport includes transport belt 1581. The transport can also include a drum, stage, or other device for moving receiver 42. Receiver 42 can be a sheet or web. Deposition unit 1550 and fuser 1560 are arranged in that order along the paper path.

Deposition unit 1550 selectively deposits toner 38 on surface 1538 of receiver 42. Deposition unit 1550 can include a photoreceptor 25 and related components shown in FIG. 1. Controller 1586 controls deposition unit 1550 to produce a pattern of toner 38 on first surface 1538 of receiver 42. The toner pattern is spaced apart by a leader space from the leading edge, i.e., is not located in leader 1543. Leader 1543 is the portion of receiver 42 within the leader space of leading edge 1541. The leader space is the length of leader 1543 and is positive; leader spaces according to various aspects are discussed below.

Receiver 42A bearing toner 38 is shown being fused in fusing device 1560. Controller 1586 can control components of fusing device 1560, e.g., the amount of heat transferred to toner 38 per unit time or the rotational speed of members of fusing device 1560.

Fusing device 1560 includes first rotatable member 1562 (e.g., a fusing roller) and second rotatable member 1564 (e.g., a pressure roller). These members can be rollers or belts, can be compliant or not, and can have compliant or rigid coatings, or not. Members 1562, 1564 have respective, different compliances, e.g., have Young's moduli differing by at least a factor of ten. Either member 1562, 1564 can be compliant, or can be mounted to yield as if it were compliant. An example of the latter is a non-compliant belt entrained around two drums that are themselves spring-mounted. Pressure applied to the belt causes the belt to move (by moving the drums), even though the belt itself is not compliant. Each member 1562, 1564 has a first end and a second end. If a member 1562, 1564 is a belt, its first and second ends are defined as the first and second ends of an axis of rotation of a member around which the belt is entrained.

In various aspects, receiver 42A is wrapped around second rotatable member 1564, forming spiral 1571. This is very different from a conventional EP fuser, in which the receiver cannot be permitted to become wrapped around the pressure roller. In various aspects, the elastomeric coating on member 1562 is thicker than that used in typical EP printers. In various aspects, receiver 42A is heated from surface 1539 that does not bear toner 38. This is also very different from a conventional EP printer, in which heat for fusing is provided directly to toner 38 on surface 1538.

In the example shown, member 1562 is compliant and member 1564 is rigid (e.g., is metallic). Specifically, member 1562 includes rigid core 1562C, e.g., a metal core, and compliant shell 1562S, e.g., an elastomeric layer, wrapped around core 1562C. Shell 1562C is also referred to as a "blanket." Shell 1562S has a Poisson ratio between 0.28 and 0.35. Shell 15625 can also have a Poisson ratio between 0.45 and 0.5. Poisson ratios are discussed below.

Figure 9B:
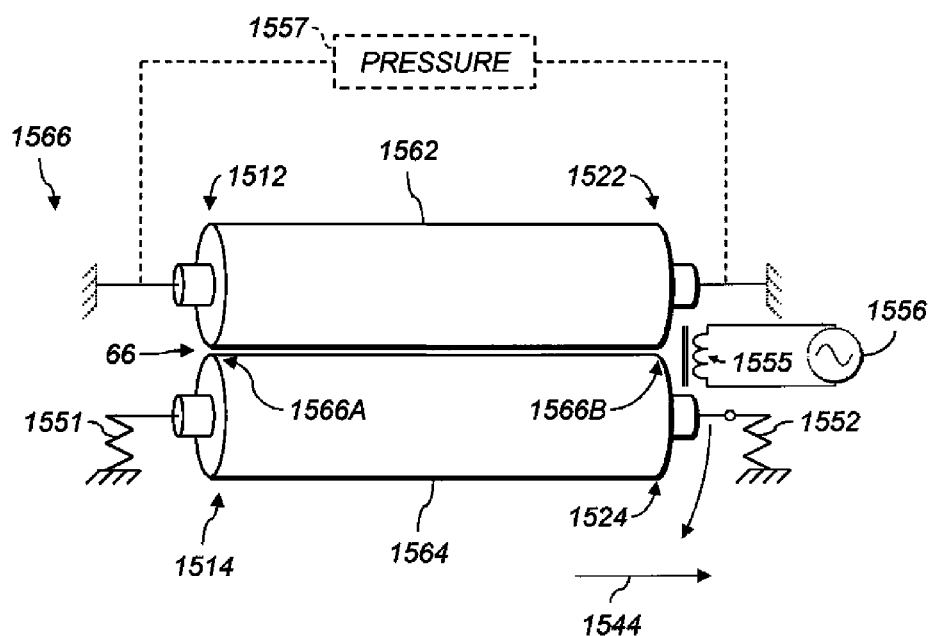
FIG. 9B is a front elevation and schematic of a fusing device.

Members 1562, 1564 are mounted on mount 1566 to form fusing nip 66. Further details of mount 1566 according to various aspects are shown in FIG. 9B, discussed below. Bold lines (dotted under mount 1566) show the path of receiver 42 through fusing nip 66.

Directing unit 1568 entrains receiver 42 around second member 1564 so that receiver 42 passes through fusing nip 66. Directing unit 1568 can operate by applying force to leading edge 1541 of receiver 42. Directing unit 1568 can include a mechanical edge or surface guide; a gripper on second member 1564; a charger to produce electrostatic hold-down forces between receiver 42 and the surface of second member 1564; a vacuum hold-down system in second member 1564, e.g., a plurality of holes through which vacuum is drawn; one or more jets of air arranged between receiver 42 and member 1564 to reduce the air pressure between receiver 42 and member 1564 according to Bernoulli's principle; or a clamp inside member 1564 that extends to grip receiver 42 at a selected angular position. In this example, receiver 42A is wrapped as spiral 1571 around member 1564 as member 1564 turns clockwise and member 1562 correspondingly turns counterclockwise (solid arrows). Wrapping can begin at an entry point, represented graphically as a five-pointed star where receiver 42A enters fusing nip 66 at rotatable member 1562.

Softening device 1563 softens toner 38 of the toner pattern, e.g., by applying heat or solvent vapors (e.g., $CH_2Cl_2$, ethyl acetate). As second member 1564 rotates through successive revolutions, corresponding layer areas of receiver 42 are defined. A "layer area" is a portion of receiver 42 that wraps once around second member 1564 from a defined starting point, e.g., the topmost point reached by the surface of second member 1564 as member 1564 rotates. As a result, layer areas can be progressively larger as more and more turns of receiver 42 are wound on member 1564. As used herein, the layer area refers to both surfaces 1538 and 1539 of receiver 42. Toner 38 is softened so that the softened toner 38 on surface 1538 in each layer area adheres to second surface 1539 of receiver 42 in an adjacent layer area. In the example shown, softening device 1563 heats a surface of member 1562 so member 1562 can heat toner 38 on receiver 42A. In other examples, softening device 1563 heats member 1564. Either member 1562 or 1564 can be heated in either toner-out or toner-in configurations, which are described below.

Using softening and wrapping, successive revolutions of member 1564 form successive layers of a three-dimensional structure, spiral 1571 in this example, and each layer (corresponding to a layer area) is affixed by toner 38 to adjacent layer(s). This is shown in the dotted inset. Second member 1564 has first layer area 42A1 of receiver 42 wrapped around it. Toner 38A1 is deposited on receiver 42 in layer area 42A1. First layer area 42A1 has second layer area 42A2 of receiver 42 wrapped around it. Toner 38A2 is deposited on receiver 42 in layer area 42A2. Toner 38A1 holds layer areas 42A1, 42A2 together. Toner 38A2 will hold layer area 42A2 to the next layer area to be wrapped around member 1564.

In the examples shown, first surface 1538 of receiver 42A is oriented away from second member 1564, as shown in the clotted inset. This is referred to herein as a "toner-out" configuration, since toner 38 is oriented outward, away from second member 1564 with respect to receiver 42A. In other examples, first surface 1538 of receiver 42A is oriented towards second member 1564. This is referred to as a "toner-in" configuration.

In various aspects, a toner-in configuration is used. The leader space is at least the circumference of second rotatable member 1564. Since toner 38 is oriented towards second member 1564, there is a nonzero probability that toner 38 will adhere to second member 1564. Leader 1543 therefore covers (wraps all the way around) second member 1564 so that the closest toner 38 to leading edge 1541 will contact leader 1543 rather than second member 1564. In various aspects, second member 1564 is heated by softening device 1563.

In other aspects, a toner-out configuration is used. The leader space is less than the circumference of second rotatable member 1564. Since toner 38 is not brought in contact with second rotatable member 1564, toner 38 will not adhere thereto. Leader 1543 therefore does not need to cover second member 1564. Leader space is still positive to permit engaging receiver 42 in fusing nip 66. In various aspects, first member 1562 is heated by softening device 1563.

In various aspects, receiver 42 includes separation feature 42S that permits leader 1543 to be separated from the rest of receiver 42. In the example shown, separation feature 42S is a score across receiver 42 to weaken receiver 42 at the trailing edge of leader 1543. Separation feature 42S can also be a perforation, a nick in an edge of receiver 42, or a crease. In toner-out configurations, leader 1543 can be removed from the three-dimensional structure after the structure has been unloaded from second member 1564.

FIG. 9B is a front elevation and schematic of fusing device 1560 (FIG. 9A). Mount 1566 is arranged adjacent to the first ends 1512, 1514 of each member 1562, 1564. Mount 1566 selectively retains members 1562, 1564 with respect to each other to form fusing nip 66. Mount 1566 also permits adjustment of respective forces between members 1562, 1564 at respective first ends 1512, 1514 and respective second ends 1522, 1524. In various aspects, mount 1566 permits disengaging at least one end 1514, 1524 from member 1562. This permits building three-dimensional structures by wrapping receiver 42 (FIG. 9A) around member 1564, then disengaging member 1564 from member 1562 sufficiently to permit sliding the three-dimensional structure off member 1564. Force adjustments also permit adjusting the radius of curvature of a three-dimensional structure being formed, as discussed below. Member 1562 can be fixed in position, as indicated by dotted chassis symbols, or can be movable. Member 1564 can also be fixed or movable.

In various aspects, mount 1566 includes magnet 1555 driven by source 1556. Magnet 1555 moves second member 1564 with respect to first member 1562. Mount 1566 can disengage from end 1524 at a separation point, represented graphically by the small circle between end 1524 and spring 1552. Magnet 1555 can selectively orient second member 1564 so that second end 1524 of member 1564 is free. For example, at the end of a fabrication run, magnet 1555 can automatically release end 1524 and permit end 1524 to swing down under the influence of gravity, as indicated by the curved arrow. This permits sliding spiral 1571 (FIG. 9A) off member 1564 in direction 1544. After spiral 1571 has been removed from member 1564, magnet 1555 can draw end 1524 back into arrangement with member 1562 to form fusing nip 66. In other examples, end 1524 is returned to position manually then held in place by magnet 1555. Solenoid locking pins can also be used in place of magnet 1555.

In various aspects, pressure unit 1557 adjusts a force between members 1562, 1564. Pressure unit 1557 can move member 1562, member 1564, or both. In this example, pressure unit 1557 moves member 1562. Pressure unit 1557 can exert force on shafts or axles of members 1562, 1564, or on magnetic mounting plates holding such shafts or axles. Such shafts or mounting plates can be magnetic, and pressure unit 1557 can include magnet 1555. Pressure unit 1557 can also include a servo, linear slide, or another type of motor or actuator, e.g., a pneumatic or hydraulic piston. Pressure unit 1557 can include one or more sensors or open- or closed-loop controllers.

In various aspects, mount 1566 is configured so that members 1562, 1564 push apart as receiver 42 thickness builds up in fusing nip 66, i.e., as more layer areas of the receiver enter fusing nip 66. This permits fusing nip 66 to apply substantially constant force to layer areas of receiver 42, rather than maintaining a constant displacement and requiring more force for each successive layer area. Applying constant force can improve uniformity between layer areas in the three-dimensional structure. In various aspects, member 1564 is mounted on springs 1551, 1552 to permit it to move to maintain force. In other aspects, member 1562 or 1564 is mounted on a linkage or an actively-controlled piston. Various constant-force configurations also provide the advantage (over a constant-displacement configuration) that they can adjust to variations in toner-stack height over the surface of the receiver. As discussed below, varying force changes the radius of curvature of the receiver, so for making flat structures, various aspects maintain constant force.

As discussed above with reference to FIGS. 6 and 7, overdrive and underdrive can be controlled to provide desired deformations of receiver 42A (FIG. 9A). In various aspects, pressure unit 1557 can control nip pressure to control the radius of curvature of receiver 42A being formed into the three-dimensional structure. Rotatable member 1562 has an elastomeric coating, and rotatable member 1564 is rigid. Therefore, as the pressure between members 1562, 1564 increases, member 1564 presses farther into member 1562. In some aspects, pressure unit 1557 controls the nip pressure between ends 1512, 1514 to be substantially equal to the nip pressure between ends 1522, 1524. By increasing nip pressure, fusing nip 66 experiences more significant overdrive (or underdrive; this discussion applies to either), i.e., a more significant difference in speed between the beginning of fusing nip 66 and the middle of fusing nip 66 (between speeds 678H, 678T on FIG. 6). As overdrive increases, the radius of curvature of receiver 42A leaving fusing nip 66 decreases, so receiver 42A is wound more tightly to form the three-dimensional structure. By adjusting nip pressure, pressure unit 1557 (which can be controlled by controller 1586 of FIG. 9A) can control the radius of curvature to make tighter or looser tubes or other curved structures from receiver 42A.

In various aspects, pressure unit 1557 controls the nip pressure between ends 1512, 1514 to be different from the nip pressure between ends 1522, 1524. The end with higher pressure has more significant overdrive, thus a tighter radius of curvature, than the other end. The result is that receiver 42A curls into a conical shape as it leaves fusing nip 66. In various aspects, the receiver is a heat-shrinking material or another material having high internal stresses. Under heat and pressure, such materials will form into a desired shape without crinkling. Examples of heat-shrinking materials are given in U.S. Publication No. 2012/0027481, published Feb. 2, 2012, incorporated herein by reference In various aspects, pressure unit 1557 controls the pressure between ends 1512 and 1514 independently of the pressure between ends 1522 and 1524. This permits forming conical three-dimensional structures. Since the pressures at the two ends are different, as discussed above, the radii of curvature of the receiver in the cross-track direction (left to right in FIG. 9B) at each end are different. This causes the receiver to curl into a shape as it exits fusing nip 66. By varying the pressure exerted by both supports uniformly, the radius of curvature of the receiver can be varied in the in-track direction. By alternating which end experiences higher pressure, wavy structures can be made.

In various aspects, overdrive or underdrive in fusing nip 66 are advantageously used to assist in forming three-dimensional structures. As discussed above with reference to FIG. 1, elastomers typically have Poisson ratios between 0.48 and 0.50. Use of such materials in fusing nip 66 can result in overdrive that can steer and wrinkle or crease materials being fed through the nip. In conventional EP printers, engagement pressure of the pressure roller with the fixing roller is kept as low as possible. In various aspects described herein, engagement pressure is increased above a pressure required to successfully fuse the toner on the receivers. In various aspects, a relatively brief pulse of higher pressure is applied between members 1562, 1564 to produce a fold, crinkle, or crease across the receiver. Various aspects include increasing a pressure between the rotatable support (pressure member 1564) and a rotatable nip-forming member (fusing member 1562), then waiting a selected length of time less than five seconds, then decreasing the pressure between the rotatable support (pressure member 1564) and the rotatable nip-forming member (fusing member 1562).

In various aspects, the pressure between members 1562, 1564 end is controlled to be greater on one end (e.g., ends 1512, 1514) than the pressure on the other end (e.g., ends 1522, 1524). This causes skew and crinkling of the receiver. Applying a relatively brief pulse of higher pressure to one end can produce a tight crinkle, crease, or fold on the receiver (a relatively long pulse of higher pressure on one end can tear the receiver). A smaller-diameter pressure member 1564 can be used to provide increased pressure from a given applied force. Applying successive brief pulses of pressure to opposite ends (e.g., at ends 1512, 1514; then subsequently at ends 1522, 1524) can be used to provide a fan-folded three-dimensional structure, since each pressure pulse will cause a fold in the opposite direction. A "brief" pulse can be, for example, a pulse that lasts for <0.5 s, or for less than the time it takes for 1 cm of the receiver to enter the fixing nip. Specifically, pulsing the pressure includes increasing a pressure between members 1562, 1564, or between respective ends of members 1562, 1564 (e.g., between 1512 and 1514, or between 1522 and 1524), for a selected limited period of time, then returning the pressure substantially to the value it had before the increase, or a value closer to the pre-increase value than to the increased value.

In various aspects, fusing nip 66 has first end 1566A and second end 1566B. The fusing step (e.g., step 440, 480, 540, or 570 shown in FIG. 4 or 5) further includes, while the receiver is passing through fusing nip 66, increasing a pressure between a rotatable support (pressure member 1564) and a rotatable nip-forming member (fusing member 1562) at first end 1566A to be different from a pressure between the rotatable support (pressure member 1564) and the rotatable nip-forming member (fusing member 1562) at second end 1566B. The pressure is held while waiting a selected length of time less than five seconds. The pressure between the rotatable support (pressure member 1564) and the rotatable nip-forming member (fusing member 1562) is then decreased at first end 1566A.

In various aspects, after the pulse at end 1566A, a pulse is applied at end 1566B. Specifically, after the decrease in pressure at end 1566A, increasing the pressure between the rotatable support (pressure member 1564) and the rotatable nip-forming member (fusing member 1562) at second end 1566B to be different from a pressure between the rotatable support (pressure member 1564) and the rotatable nip-forming member (fusing member 1562) at first end 1566A, then waiting a selected length of time less than five seconds, then decreasing the pressure between the rotatable support (pressure member 1564) and the rotatable nip-forming member (fusing member 1562) at second end 1566B. The pulses at first end 1566A, 1566B can be repeated, and interleaved in any order, to provide desired fan-folded or other three-dimensional structures.

In other aspects, a foam coating having a Poisson ratio between 0.25 and 0.35 (the foam can be composed of an elastomer) is used on the fuser roller. This permits reducing overdrive even while increasing engagement pressure. This advantageously permits using large engagement pressures in the fixing nip without subjecting the receiver to overdrive. In an example, a foam roller with a Poisson ratio between 0.25 and 0.35, operated at relatively high engagement pressure, is used to provide a flat three-dimensional structure. The sheets of the structure do not experience significant overdrive while passing through the fixing nip, so the structure does not bend towards the pressure member. This is especially beneficial when the engagement on the two ends of the nip differ. In an example, the three-dimensional structure is a cone. A foam roller as described in this paragraph is used with different engagement pressure on one end than on the other. This provides steering of the sheets exiting the fixing nip to cause them to naturally roll into a cone, as described herein. Such steering is provided with reduced probability of tearing, crinkling, or folding the receiver, since the receiver is not subject to overdrive or underdrive.

Figure 8:
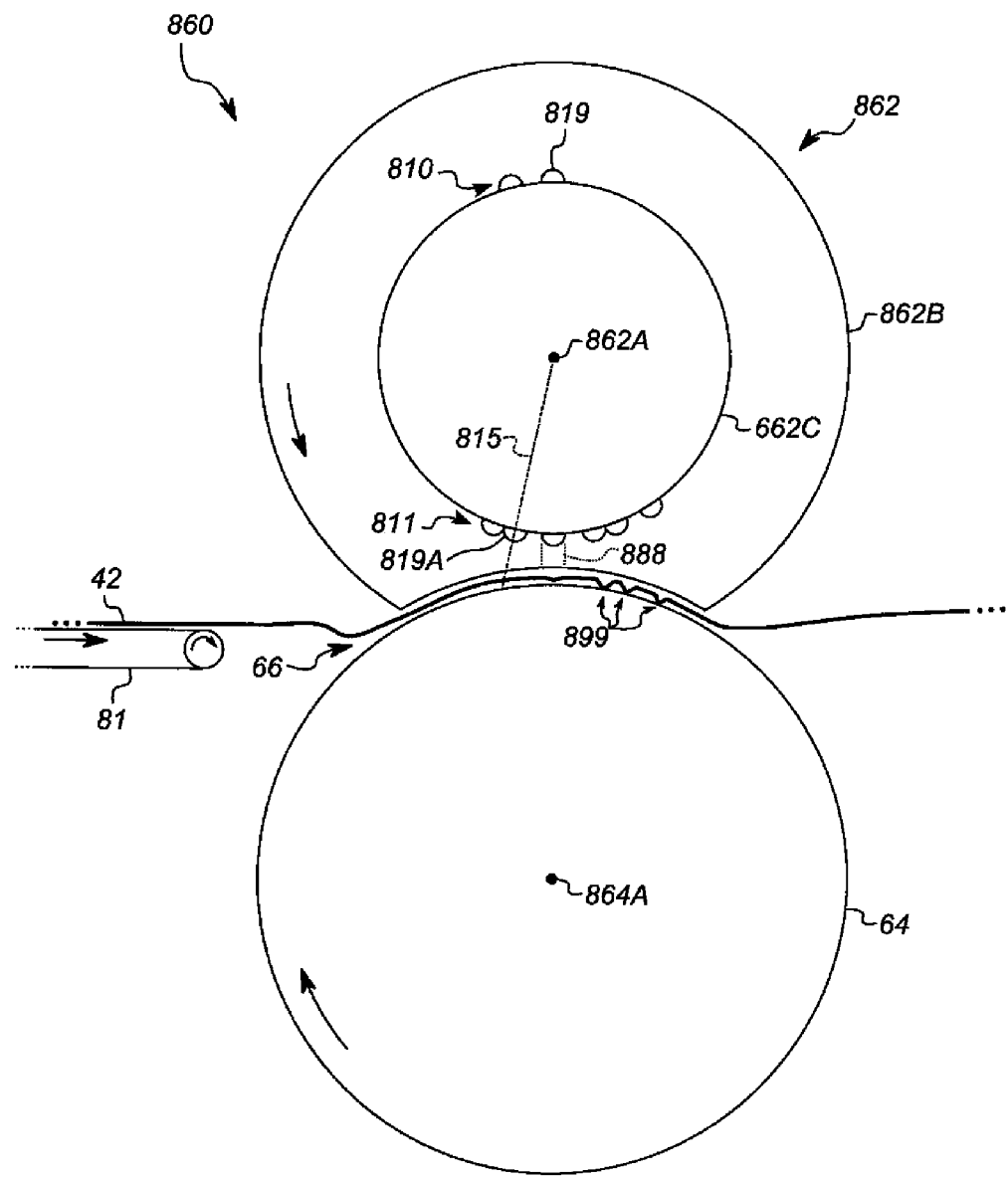
FIG. 8 is a cross-section showing an example of deformation features in a fuser.

FIG. 8 is a cross-section showing deformation features 819, 819A according to various aspects. Receiver 42, transport web 81, fusing nip 66, and pressure roller 64 are as shown in FIG. 7. Fuser 860 has fusing roller 862. Fusing roller 862 has rigid core 662C and foam blanket 862B (coating) with a selected Poisson ratio (e.g., 0-0.4). Rigid core 662C can be a roller or a belt. A plurality of deformation features 819, 819A can be used; for clarity, not all those shown are labeled.

Deformation feature 819 is disposed over, and optionally affixed to, core 662C, and protrudes from or above core 662C. Deformation feature 819 can act as a stamp to impart a desired pattern of bumps or ditches on receiver 42. Deformation feature 819 can be formed from a non-foamed elastomer or a solid material. Deformation feature 819 can be overlaid by blanket 862B (as shown), or blanket 862B can be cut to expose deformation feature 819. In the example shown, disposed over core 662C are two groups 810, 811 of deformation features 819, 819A. Any number of deformation features 819, 819A can be used, arranged into any number of groups 810, 811. In the example shown here, deformation features 819, 819A extend along core 662C (in or out of the plane of the figure).

As receiver 42 passes through fusing nip 66, deformation features 819, 819A periodically comes into operative alignment with fusing member 862 and pressure roller 64. In an example, deformation feature 819A is in operative alignment since it is positioned on straight line segment 815 from axis 862A of rotation of fusing member 862 to a point on the surface of pressure roller 64 that is closer to axis 862A than is axis 864A of rotation of pressure roller 64. When in operative alignment, a deformation feature 819, 819A presses receiver 42 against pressure roller 64, e.g., in region 888, with a selected second pressure that is higher than a selected first pressure with which blanket 862B presses receiver 42 against pressure roller 64. As a result, the sheet is indented, folded, or creased in a shape corresponding to deformation feature 819, 819A. In the example shown, group 811 has produced indentations 899.

In various aspects, fusing member 862 is a roller and deformation features 819, 819A extend in the in-track direction (clockwise or counter-clockwise, in the figure) less than 5% of the circumference of fusing member 862 (or of the total in-track extent of fusing member 862, if a belt is used instead of a roller). This reduces the probability of local overdrive in region 888 and possible resulting crinkling. In other aspects, fusing member 862 is a roller and deformation features 819, 819A extend in the in-track direction at least 25% of the circumference of fusing member 862. This provides local overdrive at deformation features 819, 819A to produce desired crinkles, creases, or folds.

Referring back to FIG. 9A, in aspects, receiver 42B passes through fusing device 1560, which softens toner 38 of the toner pattern. Directing unit 1568 is not used in these aspects; instead, directing unit 1578 wraps receiver 42B around axis 1572. Axis 1572 can be a mathematical construct; no physical axle is required. As receiver 42B passes softening device (fusing device 1560), successive layer areas of receiver 42B are defined, as discussed above. Each layer area forms a one-revolution wrap around axis 1572. The softened toner in each layer area adheres to second surface 1539 of receiver 42B in an adjacent layer area. This produces a three-dimensional structure, namely spiral 1582. Directing unit 1578 can grasp leading edge (i.e., leading edge 1541) of receiver 42B. Directing unit 1578 can include pinchers to grip receiver 42B or edge or surface guides to direct receiver 42B.

The example shown is a toner-out configuration wrapping below the plane of receiver 42 (clockwise). Toner-in configurations can be used, as can configurations wrapping above the plane of receiver 42 (counter-clockwise), in any combination. In various examples, toner 38 in the toner pattern includes a functional toner that causes receiver 42B to curl when toner 38 is softened. Such functional toners can include foaming toners and toners heated and quenched to freeze internal stresses into the toners (e.g., as described in the above-referenced U.S. Publication No. 2012/0027481). Such functional toners can also include core-shell toners in which each toner particle includes a core material surrounded by a shell material. During fusing, the core and shell materials mix and react, undergoing a volume change. In other examples, directing unit 1578 can include heater 1599 that heats toner 38 above $T_g$. In the example shown, heater 1599 heats toner 38 just before that toner 38 is brought into contact with the next layer area.

In various aspects, one of the first and second rotatable members 1562, 1564 has a smaller diameter than the other. In other aspects, members 1562, 1564 have substantially the same diameter.

Figure 13:
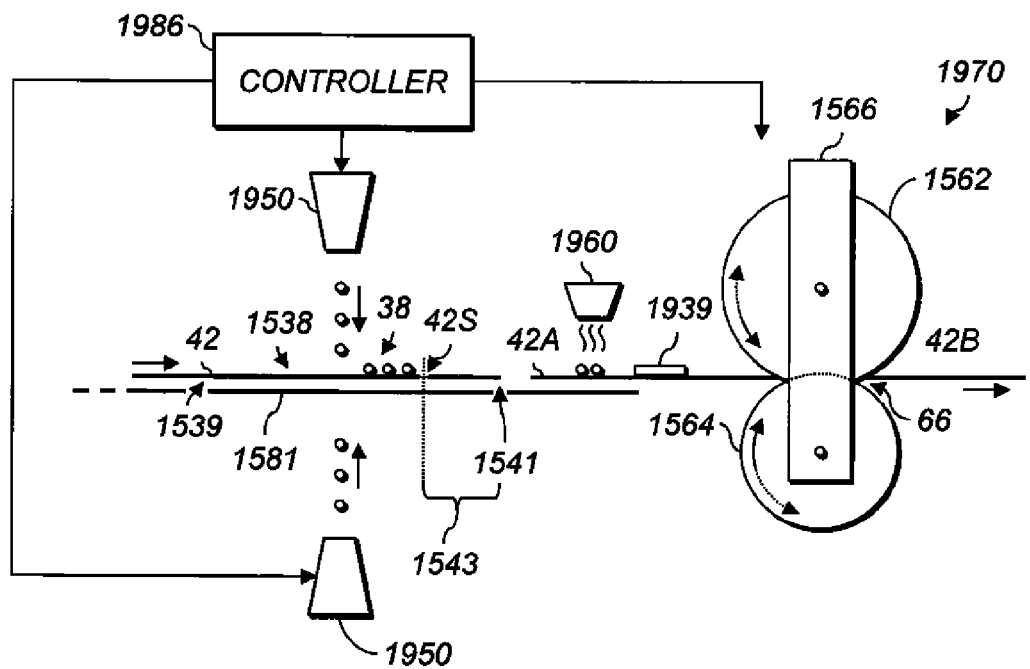
FIG. 13 shows a device for producing a three-dimensional structure from a receiver according to various aspects.

FIG. 13 shows a device for producing a three-dimensional structure from receiver 42 according to various aspects. Leading edge 1541, first surface 1538, opposed second surface 1539, leader 1543, and toner 38 are as shown in FIG. 9A.

Deposition unit 1950 selectively deposits toner 38 on first surface 1538 and second surface 1539 of receiver 42. Deposition unit 1950 can include a duplexer to permit toner 38 to be deposited successively on surfaces 1538, 1539. Deposition unit 1950 can also include separate deposition engines (shown) to deposit on surfaces 1538, 1539 simultaneously or near-simultaneously.

Controller 1986 controls deposition unit 1950 to produce a toner pattern on first surface 1538 of receiver 42. The toner pattern is spaced apart from leading edge 1541 by leader 1543.

Softening device 1960 softens toner 38 of the toner pattern on receiver 42A, e.g., by exposure to heat or solvents. In the examples shown, softening device 1960 is a radiant heater. Other ways of fusing described above can also be used to soften toner 38. Softening device 1960 can soften toner 38 on one or both sides of receiver 42A.

Z-fold system 1970 makes a z-folded stack of separate portions of a length of receiver 42A bearing softened toner 1939 (a toner mass represented graphically as a rectangle). The separate portions are not completely separated from each other mechanically. The separate portions can, e.g., be selected areas of a continuous receiver, or can be delimited and held together by perforations. Each portion of receiver 42A is joined to at least one other portion in the z-folded stack by at least one of the z-folds, as described in U.S. Pat. Ser. No. 8,505,897 issued Aug. 13, 2013, incorporated herein by reference. Z-fold system 1970 brings two separate portions of first surface 1538 into contact, or brings two separate portions of second surface 1539 into contact. At least one of the separate portions brought into contact has softened toner 1939 disposed thereupon (or thereover).

In various aspects, z-fold system 1970 includes a fusing device with mount 1566, rotatable members 1562, 1564, optional softening device 1563 (FIG. 9A), and fusing nip 66 as described in FIG. 9A. Controller 1986 is a fusing controller that successively drives rotatable members 1562, 1564 in alternating directions. Receiver 42A is entrained around second rotatable member 1564 and, as second member 1564 rotates through successive revolutions, corresponding ones of the portions of the receiver are defined. The softened toner on either surface 1538, 1539 in each portion adheres to the corresponding surface 1538, 1539 (i.e., the same surface) of receiver 42A in an adjacent portion. Softening device 1960 can heat one or both members 1562, 1564. Examples of Z-folding by reciprocating motion of rotatable member 1564 are discussed above with reference to FIGS. 12A-12B. Mount 1566 can include a pressure unit adapted to adjust a force between the first and second rotatable members. The pressure unit can also or alternatively adjust the force between the first and second rotatable members at respective first ends thereof to be greater than the force between the members at respective second ends thereof while the receiver passes through the fusing nip. This is discussed above with reference to FIG. 9B.

In various aspects, one of the first and second rotatable members has a smaller diameter and a higher Young's modulus than the other of the first and second rotatable members. In the example shown in FIG. 12A, member 62 is larger and more compliant (lower Young's modulus) than member 1864. In this arrangement, the smaller, harder roller indents the larger, more compliant roller. This geometry directs a receiver passing through the nip between the rollers toward the smaller roller, advantageously permitting readily wrapping the receiver around the smaller roller.

Figure 15:
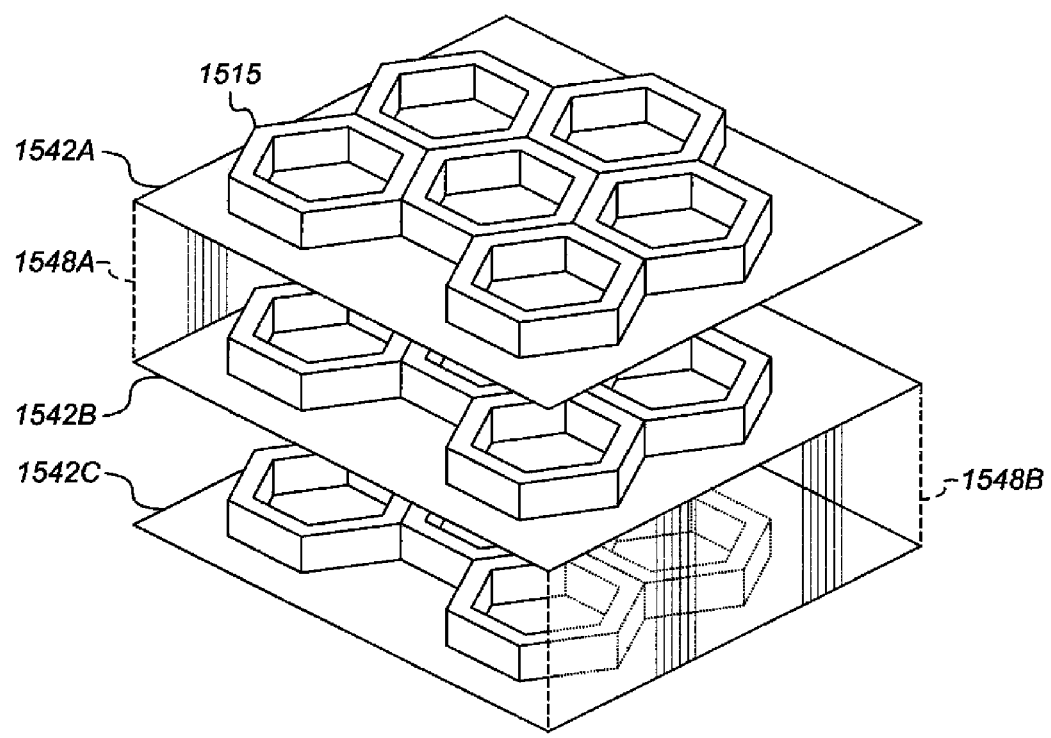
FIG. 15 is an isometric view of exemplary honeycomb toner patterns according to various aspects.

FIG. 15 is an isometric view of honeycomb toner patterns according to various aspects. Each receiver 1542A, 1542B, 1542C has printed thereon a honeycomb-shaped toner pattern 1515 (for clarity, only one is labeled). To complete the three-dimensional structure, receivers 1542A, 1542B, 1542C are stacked together so the toner pattern 1515 on each receiver 1542A, 1542B, 1542C contacts the back side of the next sheet (e.g., pattern 1515 on receiver 1542B contacts the back of receiver 1542A). The toner in toner patterns 1515 is then fused to bond receivers 1542A, 1542B, 1542C together, forming the three-dimensional structure. The honeycomb shape in these aspects is formed by printing. The thickness of the three-dimensional structure is determined by the post-fusing thickness of toner patterns 1515 and the number of receivers fused together. Shapes of toner pattern 1515 other than the hexagonal honeycomb shape shown here can be used.

In various aspects, rather than receivers 1542A, 1542B, 1542C, a single receiver is used and is Z-folded. This is represented graphically by receiver portions 1548A, 1548B. In this example, receiver portions 1542A and 1542B are connected by receiver portion 1548A, represented graphically by dashed and dotted lines. Receiver portions 1542B and 1542C are connected by receiver portion 1548B, likewise represented. The dotted outline of the honeycomb toner pattern 1515 on receiver portion 1542C represents the fact that, in various aspects, the receiver is continuous from portion 1542C across portion 1548B to portion 1542B. In this example, the receiver continues from portion 1542B across portion 1548A, to portion 1542A. In this way, the receiver makes an S-shape with toner patterns 1515 printed at various points so they align when the receiver is folded into an S.

Using toner to make honeycomb patterns advantageously provides improved control of the thickness of each toner pattern 1515 compared to patterns made with glue or other materials that change volume while curing. Using toner thus permits improved control of the mechanical properties of a honeycomb sandwich. Honeycomb structures such as that shown here can be used as structural members, e.g., as lightweight floorboards.

The invention is inclusive of combinations of the aspects described herein. References to "a particular aspect" and the like refer to features that are present in at least one aspect of the invention. Separate references to "an aspect" or "particular aspects" or the like do not necessarily refer to the same aspect or aspects; however, such aspects are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

PARTS LIST 21 charger
21a voltage source
22 exposure subsystem
23 toning station
23a voltage source
25 photoreceptor
25a voltage source
31, 32, 33, 34, 35, 36 printing module
38 toner
38A unfused toner
38A1, 38A2 toner
38B unfused toner
39 fused image
39A, 39B fused toner
40 supply unit 42, 42A receiver
42A1, 42A2 layer area
42B receiver
42S separation feature
50 transfer subsystem
60 fuser
62 fusing roller
64 pressure roller
66 fusing nip
68 release fluid application substation
69 output tray
70 finisher
81 transport web
86 cleaning station
99 logic and control unit (LCU)
100 printer
Parts List—continued
210 data-processing system
220 peripheral system
230 user-interface system
240 data-storage system
301 box blank
302 fold line
303 front surface
304 tab
305 back surface
306 flute
310, 311 liner sheet
312 fluted sheet
410 deposit first pattern of toner on first surface step
415 tack deposited toner step
420 bend receiver step
422 contact second surface to first-surface toner step
424 contact first surface to first-surface toner step
426 rotate support one revolution step
428 rotate support step
430 bring portions into contact step
440 fuse toner step
445 wrap receiver around rotatable support step
446 irradiate receiver step
450 deposit second pattern of toner on second surface step
460 bend receiver step
470 bring portions into contact step
480 fuse toner step
510 deposit first pattern of toner on first surface step
520 bend receiver step
530 bring surface into contact with toner step
Parts List—continued
535 rotate support member step
540 fuse toner step
550 deposit additional toner on first surface step
560 bring surface into contact with toner step
565 rotate support member step
570 fuse toner step
580 done? decision step
660 fuser
662 fusing roller
662B blanket
662C core
670A, 670B bulge
678H, 678P, 678T, 678W speed
760 fuser
762 fusing roller
762B blanket
771A, 771B region
778H, 778P, 778T speed
810, 811 group
815 line segment
819, 819A fuser
862 fusing roller
862A axis of rotation
862B blanket
864A axis of rotation
888 region
899 indentation
1512, 1514 first end
1515 toner pattern
1522, 1524 second end
Parts List—continued
1538 first surface of the receiver
1539 second surface of the receiver
1541 leading edge of receiver
1542A, 1542B, 1542C receiver
1543 leader
1544 direction
1548A, 1548B receiver portion
1550 deposition unit
1551, 1552 spring
1555 magnet
1556 source
1557 pressure unit
1560 fusing device
1562 rotatable member
1562C core
1562S shell
1563 softening device
1564 rotatable member
1566 mount
1566A first end
1566B second end
1568 directing unit
1571 spiral
1572 axis
1578 directing unit
1581 spiral
1582 transport belt
1586 controller
1599 heater
1601 conical roller
Parts List—continued
1602 cylindrical roller
1603 nip
1611 little end
1612 big end
1701 first portion
1702 second portion
1703 third portion
1704 fourth portion
1717 fold line
1718 fold line
1801 first portion
1802 second portion
1803 third portion
1804 fourth portion
1817 fold line
1838 toner
1839 toner
1864 rotatable support
1939 softened toner
1950 deposition unit
1960 softening device
1970 Z-fold system
1986 controller
F direction of extension
X, Y, Z direction

The invention claimed is:

1. A method for forming a three-dimensional structure, the method comprising:
   depositing a first pattern of thermoplastic toner particles onto a first surface of a receiver to form a plurality of spaced-apart stacks of toner particles that extend above the first surface of the receiver;
   bending the receiver at a fold line, thereby defining first and second portions of the receiver separated by the fold line;
   bringing at least part of a surface of the receiver in the second portion into contact with the deposited stacks of toner particles; and
   fusing the toner particles to bind the second portion to the first portion and provide a selected spacing between the first portion and the second portion;
   wherein the fusing step includes progressively wrapping the receiver around a rotatable support starting at an entry point defined with respect to the support while softening the toner at the entry point.

2. The method according to claim 1, further including tacking the first pattern of toner particles to the first surface of the receiver before bending.

3. The method according to claim 1, wherein the bending step is performed so that a normal to the first surface varies continuously at each point on the first surface other than the edges of the first surface.

4. The method according to claim 1, wherein the support is a drum mounted at one end.

5. The method according to claim 1, the fusing step further including irradiating the receiver in or upstream of the entry point to provide fusing energy to raise the temperature of the toner.

6. The method according to claim 1, wherein the fusing step includes passing the receiver through a fusing nip defined by the rotatable support and a rotatable nip-forming member pressed against each other, the support and the nip-forming member having respective radii and respective Young's moduli.

7. The method according to claim 6, wherein the support is a rotatable member mounted at one end, and the cross-section of the rotatable member varies along its length.

8. The method according to claim 7, wherein the support member is substantially conical and is mounted at the end near the base of the cone, whereby the three-dimensional structure includes a conical portion.

9. The method according to claim 1, wherein the fusing step further includes, while the receiver is passing through the fusing nip, increasing a pressure between the rotatable support and the rotatable nip-forming member, then waiting a selected length of time less than five seconds, then decreasing the pressure between the rotatable support and the rotatable nip-forming member.

10. The method according to claim 1, wherein the fusing nip has a first end and a second end and the fusing step further includes, while the receiver is passing through the fusing nip, increasing a pressure between the rotatable support and the rotatable nip-forming member at the first end to be different from a pressure between the rotatable support and the rotatable nip-forming member at the second end, then waiting a selected length of time less than five seconds, then decreasing the pressure between the rotatable support and the rotatable nip-forming member at the first end.

11. The method according to claim 10, wherein the rotatable nip-forming member has an elastomeric coating with a Poisson ratio less than 0.25 or greater than 0.35.

12. The method according to claim 1, wherein the fusing step further includes, after the decreasing-pressure step, increasing the pressure between the rotatable support and the rotatable nip-forming member at the second end to be different from a pressure between the rotatable support and the rotatable nip-forming member at the first end, then waiting a selected length of time less than five seconds, then decreasing the pressure between the rotatable support and the rotatable nip-forming member at the second end.

13. The method according to claim 1, wherein the bending step includes:
   bringing a second surface of the receiver into contact with the rotatable support; and
   a first-rotation step of rotating the support through one revolution to wind at least the first portion of the receiver onto the support;
   and wherein the bringing-into-contact step includes a subsequent-rotation step of rotating the support so that at least the second portion of the receiver is wound onto the support, and at least some of the second surface of the receiver in the second portion contacts at least one of the stacks of toner particles on the first surface of the receiver in the first portion.

14. The method according to claim 1, wherein the bending step includes bringing a second surface of the receiver into contact with at least one of the toner particle stacks on the first surface of the receiver.

15. The method according to claim 1, wherein the bending step includes bringing the first surface of the receiver into contact with at least one of the toner particle stacks on the first surface of the receiver.

16. The method according to claim 15, further including:
   depositing a second pattern of thermoplastic toner particles onto a second surface of the receiver to form a second plurality of spaced-apart stacks of toner particles that extend above the second surface of the receiver;
   bending the receiver so that non-overlapping third and fourth portions of the receiver are defined;
   bringing at least part of the second surface of the receiver in the fourth portion into contact with the deposited stacks of toner particles on the second surface; and
   fusing the toner particles to bind the fourth portion to the third portion and provide a selected spacing between the third portion and the fourth portion.

17. The method according to claim 16, wherein the first pattern of toner and the second pattern of toner are honeycomb-shaped patterns of toner.

18. The method according to claim 1, wherein the first pattern of toner is a honeycomb-shaped pattern of toner.

* * * * *